US012126812B2

United States Patent
Helmrich et al.

(10) Patent No.: US 12,126,812 B2
(45) Date of Patent: Oct. 22, 2024

(54) APPARATUS AND METHOD FOR IMPROVED VIDEO QUALITY ASSESSMENT

(71) Applicant: Fraunhofer-Gesellschaft zur Foerderung der angewandten Forschung e.V., Munich (DE)

(72) Inventors: Christian Helmrich, Berlin (DE); Sebastian Bosse, Berlin (DE); Mischa Siekmann, Berlin (DE); Soeren Becker, Berlin (DE); Johannes Erfurt, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 185 days.

(21) Appl. No.: 17/723,181

(22) Filed: Apr. 18, 2022

(65) Prior Publication Data
US 2022/0303545 A1    Sep. 22, 2022

Related U.S. Application Data

(63) Continuation of application No. PCT/EP2020/079231, filed on Oct. 16, 2020.

(30) Foreign Application Priority Data

Oct. 21, 2019    (EP) ..................... 19204452

(51) Int. Cl.
*H04N 19/154*    (2014.01)
*H04N 19/124*    (2014.01)
(Continued)

(52) U.S. Cl.
CPC ......... *H04N 19/154* (2014.11); *H04N 19/124* (2014.11); *H04N 19/176* (2014.11); *H04N 19/80* (2014.11)

(58) Field of Classification Search
None
See application file for complete search history.

(56) References Cited

U.S. PATENT DOCUMENTS

2006/0182179 A1    8/2006    Han
2019/0289296 A1*   9/2019    Kottke ................. H04N 19/179
(Continued)

FOREIGN PATENT DOCUMENTS

CN    101159813 A    4/2008
CN    103124347 A    5/2013

OTHER PUBLICATIONS

"Perceptually optimized QP adaptation and associated distortion measure", Joint Video Experts Team (JVET), doc. JVET-H0047, Macao, China (Year: 2017).*
(Continued)

*Primary Examiner* — Rebecca A Volentine
(74) *Attorney, Agent, or Firm* — Perkins Coie LLP; Michael A. Glenn

(57) ABSTRACT

An apparatus for determining visual activity information for a predetermined picture block of a video sequence including a plurality of video frames, the plurality of video frames including a current video frame and one or more timely-preceding video frames, wherein the one or more timely-preceding video frames precede the current video frame in time, is provided. The apparatus is configured to receive the predetermined picture block of each of the one or more timely-preceding video frames and the predetermined picture block of the current video frame. Moreover, the apparatus is configured to determine the visual activity information depending on the predetermined picture block of the
(Continued)

current video frame and depending on the predetermined picture block of each of the one or more timely-preceding video frames and depending on a temporal high-pass filter.

19 Claims, 6 Drawing Sheets

(51) Int. Cl.
*H04N 19/176* (2014.01)
*H04N 19/80* (2014.01)

(56) References Cited

U.S. PATENT DOCUMENTS

2019/0306502 A1   10/2019   Gadde et al.
2020/0314422 A1*  10/2020   Saeedi ................ H04N 19/139

OTHER PUBLICATIONS

Baroncini, V., "Results of Subjective Testing of Responses to the Joint CfP on Video Compression Technology with Capability Beyond HEVC", Doc. JVET-J0080, San Diego, Apr. 2018, 17 pp.

Helmrich, C., et al., "AHG10: Clean-up and Finalization of Perceptually Optimized QP Adaptation Method in VTM", Doc. JVET-M0091, Marrakech, Dec. 2018, 5 pp.

Helmrich, C., et al., "AHG10: Improved Perceptually Optimized QP Adaptation and Associated Distortion Measure", Doc. JVET-K0206, Ljubljana, Jul. 2018, 8 pp.

MCK.Kerslake, D., "The Stress of Hot Environments", p. 37, Cambridge University Press, 1972, online: https:/books.google.de/books?id=FQo9AAAAIAAJ&pg=PA37&lpg=PA37&dq=%22square+mean+root%22&q=%22square%20mean%20root%22&f=false#v=snippet&q=%22square%20mean%20root%22&f=false, 1972, 4 pp.

Osberger, W., et al., "An MPEG Encoder Incorporating Perceptually Based Quantisation", In Proc. IEEE Annual Conf. Speech & Image Technologies for Comput. & Telecomm., Brisbane, vol. 2, pp. 731-734, 1997, pp. 731-734.

"Video: VMAF—the Journey Continues", The Broadcast Knowledge Posted on Feb. 15, 2019 by Russell Trafford-Jones, Speaker: Zhi Li, Senior Software Engineer—Video Algorithms and Research Netflix. URL: https://thebroadcastknowledge.com/2019/02/15/video-vmaf-the-journey-continues/, Feb. 15, 2019, 6 pp.

Li, Zhi, et al., "VMAF: The Journey Continues", Netflix Technology Blog, Oct. 25, 2018, URL: https://netflixtechblog.com/vmaf-the-journey-continues-44b51ee9ed12, 13 pp.

Anderson, Sean Eron, "Bit Twiddling Hacks", Stanford University, 2005. http://graphics.stanford.edu/~seander/bithacks.html, 2005, 33 pp.

Barkowsky, Marcus, et al., "Temporal Trajectory Aware Video Quality Measure", IEEE Journal of Selected Topics in Signal Processing, IEEE, US, vol. 3, No. 2, Apr. 1, 2009 (Apr. 1, 2009), p. 266-279,XP011253315, 14 pp.

Bosse, Sebastian, et al., "Perceptually optimized QP adaptation and associated distortion measure", No. m41510, Oct. 13, 2017 (Oct. 13, 2017), 120. MPEG Meeting; Oct. 23, 2017-Oct. 27, 2017; Macau; (Motion Picture Expert Group or ISO/IEC JTC1/SC29/WG11), Retrieved from the Internet: URL:http://phenix.int-evry.fr/mpeg/doc_end_user/documents/, 18 pp.

Erfurt, Johannes, et al., "A Study of the Perceptually Weighted Peak Signal-to-Noise Ration (WPSNR) for Image Compression", In Proc. IEEE Int. Conf. on Image Processing (ICIP), Taipei, pp. 2339-2343, Sep. 2019., 5 pp.

Fu, Chih-Ming, et al., "Sample Adaptive Offset in the HEVC Standard", IEEE Trans. Circuits & Syst. for Video Technology, vol. 22, No. 12, pp. 1755-1764, Dec. 2012., 10 pp.

Helmrich, Christian R., et al., "Perceptually Optimized Bit-Allocation and Associated Distortion Measure for Block-Based Image or Video Coding", In Proc. IEEE Data Compression Conf. (DCC), Snowbird, pp. 172-181, Mar. 2019., Mar. 2019, 10 pp.

Helmrich, Christian R., et al., "XPSNR: A Low-Complexity Extension of the Perceptually Weighted Peak Signal-to-Noise Ratio for High-Resolution Video Quality Assessment", ICASSP 2020—2020 IEEE International Conference on Acoustics, Speech and Signal Processing (ICASSP), IEEE,May 4, 2020 (May 4, 2020), p. 2727-2731, XP033793727, 2020, 6 pp.

Li, Zhi, et al., "Toward a Practical Perceptual Video Quality Metric", Netflix, "VMAF—Video Multimethod Assessment Fusion," online: https://github.com/Netflix/vmaf, https://medium.com/netflix-techblog/toward-a-practical-perceptual-video-quality-metric-653f208b9652, 21 pp.

Philippe, P, et al., "AHG4: Subjective comparison of VVC and HEVC", Joint Video Experts Team, doc. JVET-O0451, Gothenburg, Jul. 2019., 21 pp.

Seshadrinathan, Kalpana, et al., "Motion Tuned Spatio-temporal Quality Assessment of Natural Videos", IEEE Trans. Image Processing, vol. 19, No. 2, pp. 335-350, Feb. 2010., 16 pp.

Tsai, Chia-Yang, et al., "Adaptive Loop Filtering for Video Coding", IEEE J. Selected Topics in Signal Process., vol. 7, No. 6, pp. 934-945, Dec. 2013., 12 pp.

Wang, Zhou, et al., "Image Quality Assessment: From Error Visibility to Structural Similarity", IEEE Trans. Image Process., vol. 13, No. 4, pp. 600-612, Apr. 2004, 14 pp.

Wang, Zhou, et al., "Multi-Scale Structural Similarity for Image Quality Assessment", Published in Proc. IEEE 37th Asilomar Conf. on Signals, Systems, and Computers, Nov. 2003., 6 pp.

* cited by examiner

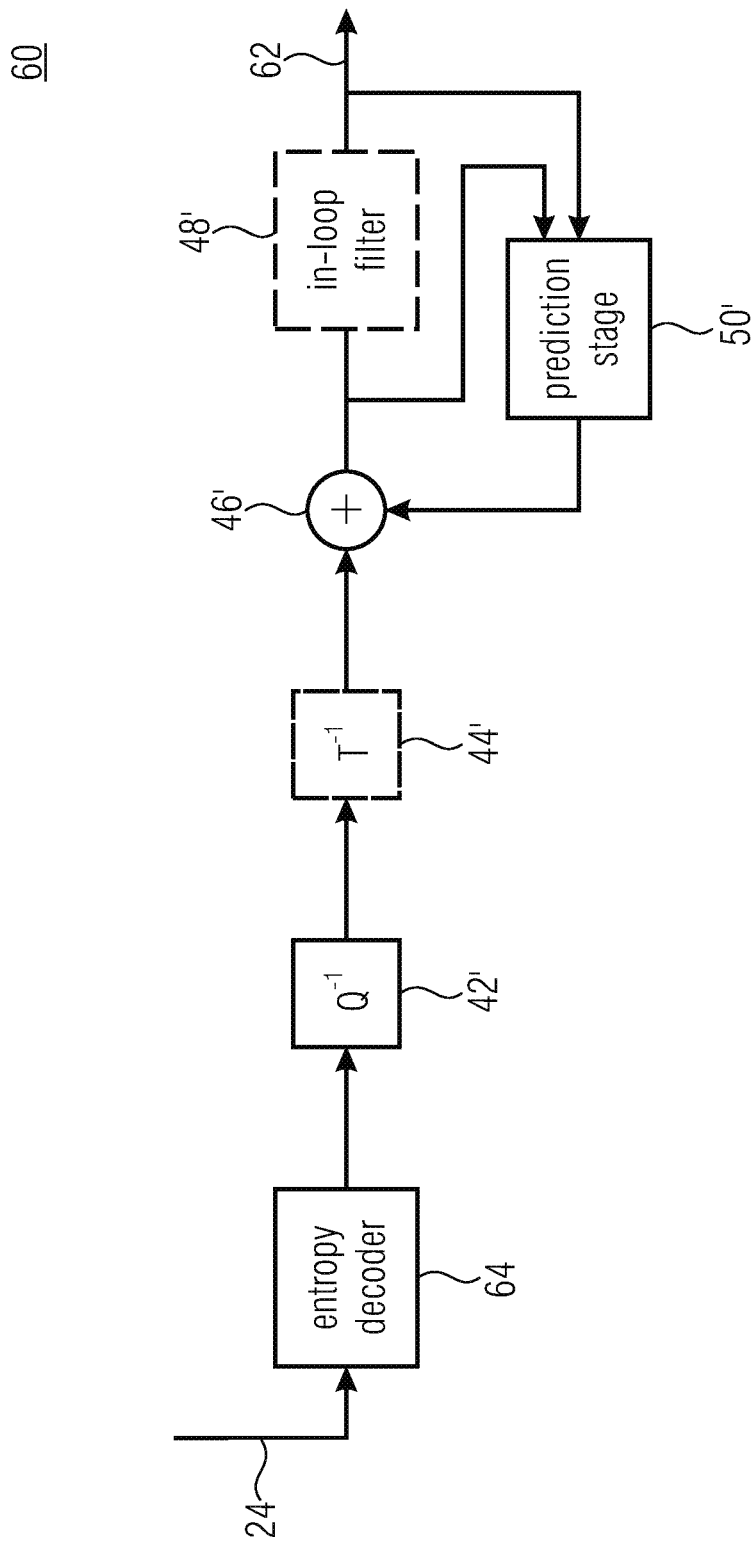

APPARATUS AND METHOD FOR IMPROVED VIDEO QUALITY ASSESSMENT

CROSS-REFERENCE TO RELATED APPLICATIONS

This application is a continuation of copending International Application No. PCT/EP2020/079231, filed Oct. 16, 2020, which is incorporated herein by reference in its entirety, and additionally claims priority from European Application No. EP 19204452.7, filed Oct. 21, 2019, which is also incorporated herein by reference in its entirety.

The present invention relates to an apparatus and method for improved video quality assessment, and, in particular, to an apparatus and method for improved perceptually weighted PSNR (WPSNR; weighted peak signal-to-noise ratio) for video quality assessment.

BACKGROUND OF THE INVENTION

The objective PSNR metric is known to correlate quite poorly with subjective impressions of video coding quality. As a result, several alternative metrics such as (MS-)SSIM and VMAF have been proposed.

In JVET-H0047 [6], a block-wise perceptually weighted distortion measure is proposed as an extension of the PSNR metric, called WPSNR, which was improved in JVET-K0206 [7] and JVET-M0091[8]. Recently, the WPSNR measure was found to correlate with subjective mean opinion score (MOS) data at least as well as (MS-)SSIM across several MOS annotated still image databases [9], see Table 1. On video data, however, the correlation with MOS scores, e. g., those provided in [4] or the results of JVET's last Call for Proposals[10], was found to be worse than that of (MS-)SSIM or VMAF, thus indicating a necessity for improvement. In the following, a summary of the block-wise WPSNR metric and a description of low-complexity WPSNR extensions for video coding, to address the above-mentioned drawbacks, are provided.

| Correlation Type | PSNR | SSIM | MS-SSIM | WPSNR |
| --- | --- | --- | --- | --- |
| SROCC | 0.8861 | 0.9509 | 0.9569 | 0.9604 |
| PLCC | 0.8730 | 0.9231 | 0.9103 | 0.9408 |

Table 1 illustrates a mean correlation between subjective MOS data and objective values across JPEG and JPEG 2000 compressed still images of four databases. SROCC: Spearman rank-order, PLCC: Pearson linear correlation [9].

Given the well-known inaccuracy of the peak signal-to-noise ratio (PSNR) in predicting average subjective judgments of visual coding quality for a given codec c and image or video stimulus s, several better performing measures have been developed over the last two decades. The most commonly used are the structural similarity measure (SSIM) [1] and its multiscale extension, the MS-S SIM [2], as well as a recently proposed video multi-method assessment fusion (VMAF) combining numerous other metrics using machine learning [4]. The VMAF approach was found to be especially useful for the assessment of video coding quality [4], but determining objective VMAF scores is algorithmically quite complex and involves two-pass processing. More importantly, the VMAF algorithm is not differentiable [5] and, therefore, cannot be used as a reference for perceptual bit-allocation strategies during image or video encoding like PSNR or SSIM-based measures.

SUMMARY

An embodiment may have an apparatus for determining visual activity information for a predetermined picture block of a video sequence including a plurality of video frames, the plurality of video frames including a current video frame and one or more timely-preceding video frames, wherein the one or more timely-preceding video frames precede the current video frame in time, wherein the apparatus is configured to receive the predetermined picture block of each of the one or more timely-preceding video frames and the predetermined picture block of the current video frame, determine the visual activity information depending on the predetermined picture block of the current video frame and depending on the predetermined picture block of each of the one or more timely-preceding video frames and depending on a temporal high-pass filter.

An embodiment may have an apparatus for determining visual activity information for a predetermined picture block of a video sequence including a plurality of video frames, the plurality of video frames including a current video frame, wherein the apparatus is configured to receive the predetermined picture block of the current video frame, determine the visual activity information depending on the predetermined picture block of the current video frame and depending on a spatial high-pass filter and/or a temporal high-pass filter, wherein the apparatus is configured to downsample the predetermined picture block of the current video frame to obtain a downsampled picture block, and to apply the spatial high-pass filter and/or the temporal high-pass filter on each of a plurality of picture samples of the downsampled picture block, or wherein the apparatus is configured to apply the spatial high-pass filter and/or the temporal high-pass filter on only a first group of the plurality of picture samples of the predetermined picture block, but not on a second group of the plurality of picture samples of the predetermined picture block.

According to an embodiment, a method for determining visual activity information for a predetermined picture block of a video sequence including a plurality of video frames, the plurality of video frames including a current video frame and one or more timely-preceding video frames, wherein the one or more timely-preceding video frames precede the current video frame in time, may have the steps of: receiving the predetermined picture block of each of the one or more timely-preceding video frames and the predetermined picture block of the current video frame, determining the visual activity information depending on the predetermined picture block of the current video frame and depending on the predetermined picture block of each of the one or more timely-preceding video frames and depending on a temporal high-pass filter.

According to another embodiment, a method for determining visual activity information for a predetermined picture block of a video sequence including a plurality of video frames, the plurality of video frames including a current video frame, may have the steps of: receiving the predetermined picture block of the current video frame, determining the visual activity information depending on the predetermined picture block of the current video frame and depending on a spatial high-pass filter and/or a temporal high-pass filter, wherein the method includes downsampling the predetermined picture block of the current video frame to obtain a downsampled picture block, and applying the spatial high-pass filter and/or the temporal high-pass filter on each of a plurality of picture samples of the downsampled picture block, or wherein the method includes applying the spatial high-pass filter and/or the temporal high-pass filter on only a first group of the plurality of picture samples of the predetermined picture block, but not on a second group of the plurality of picture samples of the predetermined picture block.

Another embodiment may have a computer program including instructions, which, when being executed on a computer or signal processor, cause the computer or signal processor to carry out any of the above methods.

According to another embodiment, an apparatus for varying a coding quantization parameter across a picture may have the steps of: an inventive apparatus for determining visual activity information, wherein the apparatus for varying the coding quantization parameter across the picture is configured to determine a coding quantization parameter for the predetermined block depending on the visual activity information.

According to another embodiment, an encoder for encoding a picture into a data stream, may have an inventive apparatus for varying a coding quantization parameter across the picture, and an encoding stage configured to encode the picture into the data stream using the coding quantization parameter.

According to another embodiment, a decoder for decoding a picture from a data stream, may have an inventive apparatus for varying a coding quantization parameter across the picture, and a decoding stage configured to decode the picture from the data stream using the coding quantization parameter.

According to another embodiment, a method for varying a coding quantization parameter across a picture may have: an inventive method for determining visual activity information, wherein the method for varying the coding quantization parameter across the picture further includes determining a coding quantization parameter for the predetermined block depending on the visual activity information.

According to another embodiment, an encoding method for encoding a picture into a data stream may have an inventive method for varying a coding quantization parameter across the picture, wherein the encoding method further includes encoding the picture into the data stream using the coding quantization parameter.

According to another embodiment, a decoding method for decoding a picture from a data stream may have an inventive method for varying a coding quantization parameter across the picture, wherein the decoding method further includes decoding the picture from the data stream using the coding quantization parameter.

Another embodiment may have a computer program including instructions, which, when being executed on a computer or signal processor, cause the computer or signal processor to carry out the inventive methods.

Another embodiment may have a data stream having a picture encoded thereinto by an inventive encoder.

An apparatus for determining visual activity information for a predetermined picture block of a video sequence comprising a plurality of video frames, the plurality of video frames comprising a current video frame and one or more timely-preceding video frames, wherein the one or more timely-preceding video frames precede the current video frame in time, is provided. The apparatus is configured to receive the predetermined picture block of each of the one or more timely-preceding video frames and the predetermined picture block of the current video frame. Moreover, the apparatus is configured to determine the visual activity information depending on the predetermined picture block of the current video frame and depending on the predetermined picture block of each of the one or more timely-preceding video frames and depending on a temporal high-pass filter.

Moreover, an apparatus for determining visual activity information for a predetermined picture block of a video sequence comprising a plurality of video frames, the plurality of video frames comprising a current video frame, is provided. The apparatus is configured to receive the predetermined picture block of the current video frame. Furthermore, the apparatus is configured to determine the visual activity information depending on the predetermined picture block of the current video frame and depending on a spatial high-pass filter and/or a temporal high-pass filter. Moreover, the apparatus is configured to downsample the predetermined picture block of the current video frame to obtain a downsampled picture block, and to apply the spatial high-pass filter and/or the temporal high-pass filter on each of a plurality of picture samples of the downsampled picture block; or, the apparatus is configured to apply the spatial high-pass filter and/or the temporal high-pass filter on only a first group of the plurality of picture samples of the predetermined picture block, but not on a second group of the plurality of picture samples of the predetermined picture block.

Furthermore, an apparatus for varying a coding quantization parameter across a picture according to an embodiment is provided, which comprises an apparatus for determining visual activity information as described above. The apparatus for varying the coding quantization parameter across the picture is configured to determine a coding quantization parameter for the predetermined block depending on the visual activity information.

Moreover, an encoder for encoding a picture into a data stream is provided. The encoder comprises an apparatus for varying a coding quantization parameter across the picture as described above, and an encoding stage configured to encode the picture into the data stream using the coding quantization parameter.

Furthermore, a decoder for decoding a picture from a data stream is provided. The decoder comprises an apparatus for varying a coding quantization parameter across the picture as described above, and a decoding stage configured to decode the picture from the data stream using the coding quantization parameter. The decoding stage is configured to decode from the data stream a residual signal, dequantize the residual signal using the coding quantization parameter and decode the picture from the data stream using the residual signal and using predictive decoding.

Moreover, a method for determining visual activity information for a predetermined picture block of a video sequence comprising a plurality of video frames, the plurality of video frames comprising a current video frame and one or more timely-preceding video frames, wherein the one or more timely-preceding video frames precede the current video frame in time, is provided. The method comprises:

Receiving the predetermined picture block of each of the one or more timely-preceding video frames and the predetermined picture block of the current video frame. And:

Determining the visual activity information depending on the predetermined picture block of the current video frame and depending on the predetermined picture block of each of the one or more timely-preceding video frames and depending on a temporal high-pass filter.

Furthermore, a method for determining visual activity information for a predetermined picture block of a video sequence comprising a plurality of video frames, the plurality of video frames comprising a current video frame, is provided. The method comprises:

Receiving the predetermined picture block of the current video frame. And:

Determining the visual activity information depending on the predetermined picture block of the current video frame and depending on a spatial high-pass filter and/or a temporal high-pass filter.

The method comprises downsampling the predetermined picture block of the current video frame to obtain a downsampled picture block, and applying the spatial high-pass filter and/or the temporal high-pass filter on each of a plurality of picture samples of the downsampled picture block. Or, the method comprises applying the spatial high-pass filter and/or the temporal high-pass filter on only a first group of the plurality of picture samples of the predetermined picture block, but not on a second group of the plurality of picture samples of the predetermined picture block.

Moreover, a method for varying a coding quantization parameter across a picture according to an embodiment is provided. The method comprises a method for determining visual activity information as described above.

The method for varying the coding quantization parameter across the picture further comprises determining a coding quantization parameter for the predetermined block depending on the visual activity information.

Furthermore, an encoding method for encoding a picture into a data stream according to an embodiment is provided. The encoding method comprises a method for varying a coding quantization parameter across the picture as described above.

The encoding method further comprises encoding the picture into the data stream using the coding quantization parameter.

Moreover, a decoding method for decoding a picture from a data stream according to an embodiment is provided. The decoding method comprises a method for varying a coding quantization parameter across the picture as described above.

The decoding method further comprises decoding the picture from the data stream using the coding quantization parameter.

Moreover, a computer program is provided comprising instructions, which, when being executed on a computer or signal processor, cause the computer or signal processor to carry out one of the above-described methods.

Moreover, a data stream having a picture encoded thereinto by an encoder as described above is provided.

Embodiments demonstrate that, by means of a low-complexity extension of our previous work on a perceptually weighted PSNR (WPSNR) presented in JVET-H0047, JVET-K0206, JVET-M0091, a motion aware WPSNR algorithm can be obtained which yields similar levels of correlation with subjective mean opinion scores than the above-mentioned state-of-the-art metrics, with lower algorithmic complexity.

BRIEF DESCRIPTION OF THE DRAWINGS

Embodiments of the present invention will be detailed subsequently referring to the appended drawings, in which:

FIG. 6 shows a possible decoder configured to decode from data stream, a reconstructed version of video and/or picture.

DETAILED DESCRIPTION OF THE INVENTION

Figure 1:
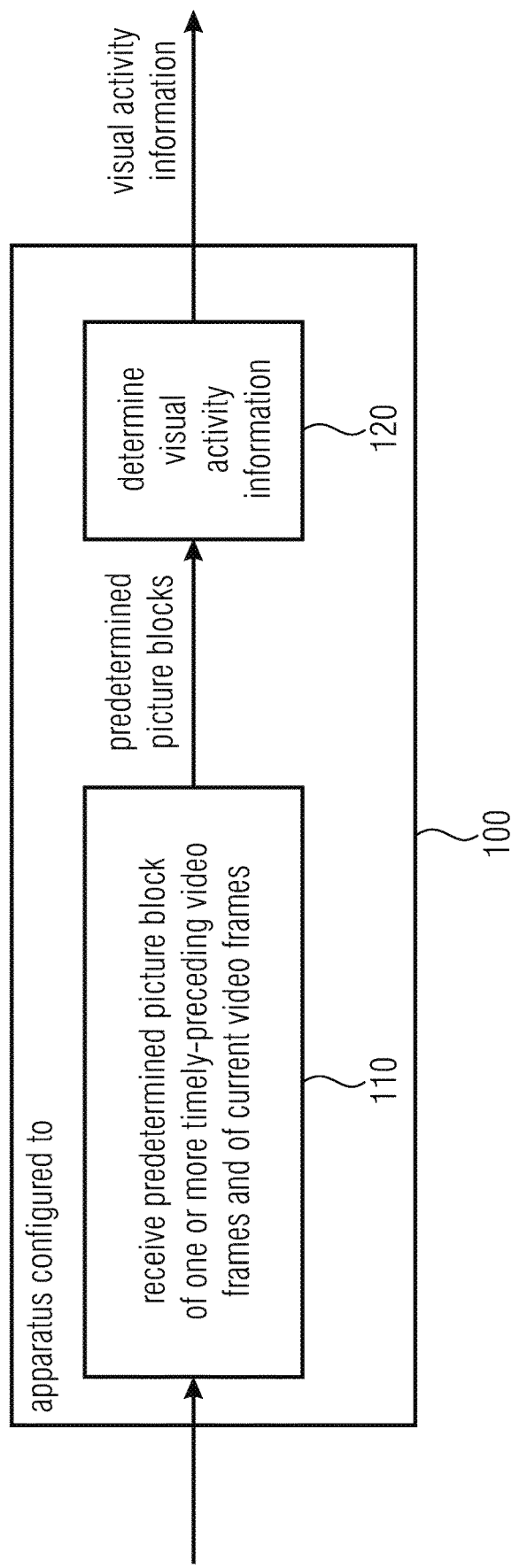
FIG. 1 illustrates an apparatus for determining visual activity information according to an embodiment.

FIG. 1 illustrates an apparatus for determining visual activity information for a predetermined picture block of a video sequence comprising a plurality of video frames according to an embodiment is provided. The plurality of video frames comprising a current video frame and one or more timely-preceding video frames, wherein the one or more timely-preceding video frames precede the current video frame in time.

The apparatus is configured to receive, e.g., by a first module 110, the predetermined picture block of each of the one or more timely-preceding video frames and the predetermined picture block of the current video frame.

Moreover, the apparatus is configured to determine, e.g., by a second module 120, the visual activity information depending on the predetermined picture block of the current video frame and depending on the predetermined picture block of each of the one or more timely-preceding video frames and depending on a temporal high-pass filter.

According to an embodiment, the temporal high-pass filter may, e.g., be a Finite Impulse Response filter.

In an embodiment, the apparatus 100 may, e.g., be configured to apply the temporal high-pass filter by combining a picture sample of the predetermined picture block of the current video frame and a picture sample of the predetermined picture block of each of the one or more timely-preceding video frames.

According to an embodiment, each of the picture samples of the predetermined picture block of the current video frame and of the picture samples of the predetermined picture block of each of the one or more timely-preceding video frames may, e.g., be a luminance value. Or, each of the picture samples of the predetermined picture block of the current video frame and of the picture samples of the predetermined picture block of each of the one or more timely-preceding video frames may, e.g., be a chrominance value. Or, each of the picture samples of the predetermined picture block of the current video frame and of the picture samples of the predetermined picture block of each of the one or more timely-preceding video frames may, e.g., be a red value or a green value or a blue value.

In an embodiment, the one or more timely-preceding video frames are exactly one timely-preceding video frame. The apparatus 100 may, e.g., be configured to apply the temporal high-pass filter by combining the picture sample of the predetermined picture block of the current video frame and the picture sample of the predetermined picture block of the exactly one timely-preceding video frame.

According to an embodiment, the temporal high-pass filter may, e.g., be defined according to:

$$h_{t_i}[x,y] = s_i[x,y] - s_{i-1}[x,y],$$

wherein x is a first coordinate value of a sample position within the predetermined picture block, wherein y is a second coordinate value of the sample position within the predetermined picture block, wherein $s_i[x, y]$ indicates the picture sample of the predetermined picture block of the current video frame at position (x, y), wherein $s_{i-1}[x, y]$ indicates the picture sample of the predetermined picture block of the exactly one timely-preceding video frame at the position (x, y), wherein $h_{t_i}[x, y]$ indicates a picture sample of the predetermined picture block, which results from applying the temporal high-pass filter.

In an embodiment, the one or more timely-preceding video frames are two or more timely-preceding video frames. The apparatus 100 may, e.g., be configured to apply the temporal high-pass filter by combining the picture sample of the predetermined picture block of the current video frame and the picture sample of the predetermined picture block of each of the two or more timely-preceding video frames.

According to an embodiment, the one or more timely-preceding video frames are exactly two timely-preceding video frames, A first timely-preceding video frame one of the exactly two timely-preceding video frames immediately precedes the current video frame in time, and wherein a second timely-preceding video frame of the exactly two timely-preceding video frames immediately precedes the first timely-preceding video frame in time. The apparatus 100 may, e.g., be configured to apply the temporal high-pass filter by combining the picture sample of the predetermined picture block of the current video frame and the picture sample of the predetermined picture block of the first timely-preceding video frame and the picture sample of the predetermined picture block of the second timely-preceding video frame.

In an embodiment, the temporal high-pass filter may, e.g., be defined according to:

$$h_{t_i}[x,y] = s_i[x,y] - 2s_{i-1}[x,y] + s_{i-2}[x,y],$$

wherein x is a first coordinate value of a sample position within the predetermined picture block, wherein y is a second coordinate value of the sample position within the predetermined picture block, wherein $s_i[x, y]$ indicates the picture sample of the predetermined picture block of the current video frame at position (x, y), wherein $s_{i-1}[x, y]$ indicates the picture sample of the predetermined picture block of the first timely-preceding video frame at the position (x, y), wherein $s_{i-2}[x, y]$ indicates the picture sample of the predetermined picture block of the second timely-preceding video frame at the position (x, y), wherein $h_{t_i}[x, y]$ indicates a picture sample of the predetermined picture block, which results from applying the temporal high-pass filter.

According to an embodiment, the apparatus 100 may, e.g., be configured to combine a spatially high-pass filtered version of the picture sample of the predetermined picture block of the current video frame and a temporally high-pass filtered picture sample, which results from applying the temporal high-pass filter by combining the picture sample of the predetermined picture block of the current video frame and the picture sample of the predetermined picture block of each of the one or more timely-preceding video frames.

In an embodiment, the apparatus 100 may, e.g., be configured to combine the spatially high-pass filtered version of the picture sample of the predetermined picture block of the current video frame and the temporally high-pass filtered picture sample may, e.g., be defined according to:

$$|h_{s_i}[x,y]| + \gamma |h_{t_i}[x,y]|$$

wherein $h_{s_i}[x,y]$ indicates the spatially high-pass filtered version of the picture sample of the predetermined picture block of the current video frame at position (x, y), wherein γ indicates a constant number with γ>0, and wherein $h_{t_i}[x, y]$ indicates the temporally high-pass filtered picture sample.

According to an embodiment, γ may, e.g., be defined as γ=2.

In an embodiment, to obtain a plurality of intermediate picture samples of the predetermined block, for each picture sample of a plurality of picture samples of the predetermined block, the apparatus 100 may, e.g., be configured to determine an intermediate picture sample by combining the spatially high-pass filtered version of said picture sample of the predetermined picture block of the current video frame and the temporally high-pass filtered picture sample, which results from applying the temporal high-pass filter by combining said picture sample of the predetermined picture block of the current video frame and said picture sample of the predetermined picture block of each of the one or more timely-preceding video frames. The apparatus 100 may, e.g., be configured to determine a sum of the plurality of picture samples.

According to an embodiment, the apparatus 100 may, e.g., be configured to determine the visual activity information depending on $$\frac{1}{4N^2} \cdot \sum_{[x,y] \in B_k} |h_{s_i}[x, y]| + \gamma |h_{t_i}[x, y]|$$

wherein $|h_{s_i}[x, y]| + \gamma |h_{t_i}[x, y]|$ is one of the plurality of intermediate picture samples at (x, y), wherein $B_k$ indicates the predetermined block having N×N picture samples.

In an embodiment, the apparatus 100 may, e.g., be configured to determine the visual activity information according to $$\hat{a}_k = \max\left(a_{min}^2, \left(\frac{1}{4N^2} \cdot \sum_{[x,y] \in B_k} |h_{s_i}[x, y]| + \gamma |h_{t_i}[x, y]|\right)^2\right)$$

wherein $\hat{a}_k$ indicates the visual activity information, and wherein $a_{min}^2$ indicates a minimum value greater than or equal to 0.

According to an embodiment, the apparatus 100 may, e.g., be an apparatus for determining a visual quality value for the video sequence. The apparatus 100 may, e.g., be configured to obtain a plurality of visual activity values by determining the visual activity information for each picture block of one or more of the plurality of picture blocks of one or more of the plurality of video frames of the video sequence. Moreover, the apparatus 100 may, e.g., be configured to determine the visual quality value depending on the plurality of visual activity values.

In an embodiment, the apparatus 100 may, e.g., be configured to obtain the plurality of visual activity values by determining the visual activity information for each picture block of the plurality of picture blocks of one or more of the plurality of video frames of the video sequence.

According to an embodiment, the apparatus 100 may, e.g., be configured to obtain the plurality of visual activity values by determining the visual activity information for each picture block of the plurality of picture blocks of each video frame of the plurality of video frames of the video sequence.

In an embodiment, the apparatus 100 may, e.g., be configured to determine the visual quality value for the video sequence by determining a visual quality value for a video frame of one or more of the plurality of video frames of the video sequence.

According to an embodiment, the apparatus 100 may, e.g., be configured to define the visual quality value for said video frame of the plurality of video frames of the video sequence according to:

$$WPSNR_{c,s} = 10 \cdot \log_{10}\left(\frac{W \cdot H \cdot (2^{BD} - 1)^2}{\sum_{k \in s}\left(w_k \cdot \sum_{[x,y] \in B_k}(s_c[x,y] - s[x,y])^2\right)}\right)$$

wherein $WPSNR_{c,s}$ indicates the visual quality value for said video frame, wherein W is a width of a plurality of picture samples of said video frame, wherein H is a height of the plurality of picture samples of said video frame, wherein BD is the coding bit-depth per sample, and wherein $s[x, y]$ is an original picture sample at (x, y), wherein $s_c[x, y]$ is a decoded picture sample at (x, y), which results from decoding an encoding of the original picture sample at (x, y), and wherein $$w_k = \left(\frac{a_{pic}}{a_k}\right)^\beta$$

wherein $a_k$ is the visual activity information for said picture block, wherein $a_{pic}>0$, and wherein $0<\beta<1$.

In an embodiment, the apparatus 100 may, e.g., be configured to determine the visual quality value for the video sequence by determining a visual quality value for each video frame of the plurality of video frames of the video sequence,
wherein the apparatus 100 may, e.g., be configured to determine the visual quality value for the video sequence according to:

$$WPSNR_c = \frac{1}{F} \cdot \sum_{i=1}^{F} WPSNR_{c,s_i},$$

wherein $WPSNR_c$ indicates the visual quality value for the video sequence,
wherein $s_i$ indicates one of the plurality of video frames of the video sequence,
wherein $WPSNR_{c,s_i}$ indicates the visual quality value for said one of the plurality of video frames of the video sequence being indicated by $s_i$, and
wherein F indicates a number of the plurality of video frames of the video sequence.

According to an embodiment, $WPSNR_{c,s_i}$ may, e.g., be defined as $WPSNR_{c,s}$ above.

In an embodiment, the apparatus 100 may, e.g., be configured to determine the visual quality value for the video sequence by averaging frame-wise weighted distortions of the plurality of video frames of the video sequence.

According to an embodiment, n the apparatus 100 may, e.g., be configured to determining the visual quality value for the video sequence according to $$WPSNR'_c = 10 \cdot \log_{10}\left(\frac{F \cdot W \cdot H \cdot (2^{BD} - 1)^2}{\sum_{i=1}^{F}\left(\sum_{k \in i}\left(w_k \cdot \sum_{[x,y] \in B_k}(s_{c,i}[x,y] - s_i[x,y])^2\right)\right)}\right),$$

wherein $WPSNR'_c$ indicates the visual quality value for the video sequence, wherein F indicates a number of the plurality of video frames of the video sequence, wherein W is a width of a plurality of picture samples of said video frame, wherein H is a height of the plurality of picture samples of said video frame, wherein BD is the coding bit-depth per sample, and wherein i is an index indicating one of the plurality of video frames of the video sequence, wherein k is an index indicating one of the plurality of picture blocks of one of the plurality of video frames of the video sequence, wherein $B_k$ is said one of the plurality of picture blocks of one of the plurality of video frames of the video sequence, wherein $s_i[x, y]$ is an original picture sample at (x, y), wherein $s_{c,i}[x, y]$ is a decoded picture sample at (x, y), which results from decoding an encoding of the original picture sample at (x, y), wherein $$w_k = \left(\frac{a_{pic}}{a_k}\right)^\beta$$

wherein $a_k$ is the visual activity information for said picture block $B_k$, wherein $a_{pic}>0$, and wherein $0<\beta<1$.

In an embodiment, the apparatus 100 may, e.g., be configured to determine the visual quality value for the video sequence according to $$WPSNR''_c = \delta \cdot \left(\frac{1}{F} \cdot \sum_{i=1}^{F} WPSNR_{c,s_i}\right) + (1-\delta) \cdot WPSNR'_c$$

wherein $WPSNR''_c$ indicates the visual quality value for the video sequence, wherein F indicates a number of the plurality of video frames of the video sequence, wherein $WPSNR'_c$ is defined above, wherein $WPSNR_{c,s_i}$ is defined as $WPSNR_{c,s}$ above, wherein $0<\delta<1$.

According to an embodiment, $\delta$ may, e.g., be defined as $\delta = 0.5$.

In an embodiment, the apparatus 100 may, e.g., be configured to determine the visual quality value for the video sequence according to $$WPSNR_c^{smr} =$$

$$20 \cdot \log_{10}\left(\frac{F \cdot \sqrt{WH} \cdot (2^{BD} - 1)}{\sum_{i=1}^{F}\sqrt{\sum_{k \in i}\left(w_k \cdot \sum_{[x,y] \in B_k}(s_{c,i}[x,y] - s_i[x,y])^2\right)}}\right)$$

wherein $WPSNR_c^{smr}$ indicates the visual quality value for the video sequence, wherein F indicates a number of the plurality of video frames of the video sequence, wherein W is a width of a plurality of picture samples of said video frame, wherein H is a height of the plurality of picture samples of said video frame, wherein BD is the coding bit-depth per sample, and wherein i is an index indicating one of the plurality of video frames of the video sequence, wherein k is an index indicating one of the plurality of picture blocks of one of the plurality of video frames of the video sequence, wherein $B_k$ is said one of the plurality of picture blocks of one of the plurality of video frames of the video sequence, wherein $s_i[x, y]$ is an original picture sample at (x, y), wherein $s_{c,i}[x, y]$ is a decoded picture sample at (x, y), which results from decoding an encoding of the original picture sample at (x, y), $$w_k = \left(\frac{a_{pic}}{a_k}\right)^\beta$$

wherein $a_k$ is the visual activity information for said picture block $B_k$, wherein $a_{pic}>0$, and wherein $0<\beta<1$.

According to an embodiment, may, e.g., be defined as $\beta=0.5$, and $$a_{pic} = 2^{BD} \cdot \sqrt{\frac{3840 \cdot 2160}{W \cdot H}}, \text{ or}$$

$$a_{pic} = \hat{a}_{pic} = 2^{(BD+1)} \cdot \sqrt{\frac{3840 \cdot 2160}{W \cdot H}}.$$

In an embodiment, the apparatus 100 may, e.g., be configured to determine 120 the visual activity information depending on a spatial high-pass filter and/or the temporal high-pass filter.

According to an embodiment, the apparatus 100 may, e.g., be configured to downsample the predetermined picture block of the current video frame to obtain a downsampled picture block, and to apply the spatial high-pass filter and/or the temporal high-pass filter on each of a plurality of picture samples of the downsampled picture block. Or, the apparatus 100 may, e.g., be configured to apply the spatial high-pass filter and/or the temporal high-pass filter on only a first group of the plurality of picture samples of the predetermined picture block, but not on a second group of the plurality of picture samples of the predetermined picture block.

Moreover, an apparatus 100 for determining visual activity information for a predetermined picture block of a video sequence comprising a plurality of video frames, the plurality of video frames comprising a current video frame according to an embodiment e.g., is provided.

The apparatus is configured to receive 110 the predetermined picture block of the current video frame.

Moreover, the apparatus 100 is configured to determine 120 the visual activity information depending on the predetermined picture block of the current video frame and depending on a spatial high-pass filter and/or a temporal high-pass filter.

Furthermore, the apparatus 100 is configured to downsample the predetermined picture block of the current video frame to obtain a downsampled picture block, and to apply the spatial high-pass filter and/or the temporal high-pass filter on each of a plurality of picture samples of the downsampled picture block. Or, the apparatus 100 is configured to apply the spatial high-pass filter and/or the temporal high-pass filter on only a first group of the plurality of picture samples of the predetermined picture block, but not on a second group of the plurality of picture samples of the predetermined picture block.

According to an embodiment, the apparatus 100 may, e.g., be configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an even row index and which are located in a column with an even column index, but not on the second group of the plurality of picture samples of the predetermined picture block, comprising exactly those of the plurality of picture samples of the predetermined picture block which are located in a row with an odd row index and/or which are located in a column with an odd column index.

Or, the apparatus 100 may, e.g., be configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an odd row index and which are located in a column with an odd column index, but not on the second group of the plurality of picture samples of the predetermined picture block, comprising exactly those of the plurality of picture samples of the predetermined picture block which are located in a row with an even row index and/or which are located in a column with an even column index.

Or, the apparatus 100 may, e.g., be configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an odd row index and which are located in a column with an even column index, but not on the second group of the plurality of picture samples of the predetermined picture block, comprising exactly those of the plurality of picture samples of the predetermined picture block which are located in a row with an even row index and/or which are located in a column with an odd column index.

Or, the apparatus 100 may, e.g., be configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an even row index and which are located in a column with an odd column index, but not on the second group of the plurality of picture samples of the predetermined picture block, comprising exactly those of the plurality of picture samples of the predetermined picture block which are located in a row with an odd row index and/or which are located in a column with an even column index.

In an embodiment, the spatial high-pass filter being applied on only the first group of the plurality of picture samples may, e.g., be defined according to:

$$\check{h}_{s_i}[x, y] = s_i[x, y] * \check{H}_s$$

wherein $$\check{H}_s = \begin{bmatrix} -1 & -1 & -2 & -2 & -1 & -1 \\ -1 & -1 & -2 & -2 & -1 & -1 \\ -2 & -2 & 12 & 12 & -2 & -2 \\ -2 & -2 & 12 & 12 & -2 & -2 \\ -1 & -1 & -2 & -2 & -1 & -1 \\ -1 & -1 & -2 & -2 & -1 & -1 \end{bmatrix}, \text{ or}$$

$$\check{H}_s = \begin{bmatrix} 0 & -1 & -1 & -1 & -1 & 0 \\ -1 & -2 & -3 & -3 & -2 & -1 \\ -1 & -3 & 12 & 12 & -3 & -1 \\ -1 & -3 & 12 & 12 & -3 & -1 \\ -1 & -2 & -3 & -3 & -2 & -1 \\ 0 & -1 & -1 & -1 & -1 & 0 \end{bmatrix},$$

wherein $s_i[x, y]$ indicates a picture sample of the first group.

According to an embodiment, the temporal high-pass filter may, e.g., be defined according to $\check{h}_{t_i}[x, y]=\check{s}_i[x, y]-\check{s}_{i-1}[x, y]$, or according to $\check{h}_{t_i}[x, y]=\check{s}_i[x, y]-2\check{s}_{i-1}[x, y]+\check{s}_{i-2}[x, y]$, wherein x is a first coordinate value of a sample position within the predetermined picture block, wherein y is a second coordinate value of the sample position within the predetermined picture block, wherein $\check{s}_i[x, y]$ indicates the picture sample of the predetermined picture block of the current video frame at position (x, y), wherein $\check{s}_{i-1}[x, y]$ indicates the picture sample of the predetermined picture block of the first timely-preceding video frame at the position (x, y), wherein $s_{i-2}[x, y]$ indicates the picture sample of the predetermined picture block of the second timely-preceding video frame at the position (x, y), wherein $h_{t_i}[x, y]$ indicates a picture sample of the predetermined picture block, which results from applying the temporal high-pass filter.

Before describing further embodiments, a review of Block-Based WPNSR algorithms is provided.

The $WPSNR_{c,s}$ value for codec c and video frame (or still image stimulus) s is given, similarly to PSNR, by $$WPSNR_{c,s} = 10 \cdot \log_{10}\left(\frac{W \cdot H \cdot (2^{BD} - 1)^2}{\sum_{k \in s}\left(w_k \cdot \sum_{[X,y] \in B_k}(s_c[x, y] - s[x, y])^2\right)}\right), \quad (1)$$

where W and H are the luma width and height, respectively, of s, BD is the coding bit-depth per sample, and $$w_k = \left(\frac{a_{pic}}{a_k}\right)^\beta \text{ with } a_{pic} = 2^{BD} \cdot \sqrt{\frac{3840 \cdot 2160}{W \cdot H}}, \beta = 0.5 \quad (2)$$

denotes the sensitivity weight for each N·N sized block $B_k$, derived from the block's spatial activity $a_k$, with $$N = \text{round}\left(128 \cdot \sqrt{\frac{W \cdot H}{3840 \cdot 2160}}\right). \quad (3)$$

$a_{pic}$ was chosen such that $w_k \approx 1$ over a large set of images. Note that, if $w_k=1$ for all k, the PSNR is obtained. See [9], [11] for details. For videos, the frame-wise $WPSNR_{c,s}$ values are averaged to obtain the final output:

$$WPSNR_c = \frac{1}{F} \cdot \sum_{i=1}^{F} WPSNR_{c,s_i}, \quad (4)$$

where F indicates the total number of frames in the video. High-quality videos usually have $WPSNR_c \approx 40$.

In the following, extensions of WPSNR for Moving Pictures according to embodiments are provided.

The spatially adaptive WPSNR algorithm introduced above can be easily extended to motion picture signals $s_i$, where i represents the frame index in the video, by introducing temporal adaptation into the calculation of the visual activity $a_k$. Previously, $a_k$ was determined from a high-pass filtered $s_i$ as $$a_k = \max\left(a_{min}^2, \left(\frac{1}{4N^2} \cdot \sum_{[x,y] \in B_k} |h_{s_i}[x, y]|\right)^2\right), \quad (5)$$

with $h_s$ being the high-pass filtered signal obtained using the convolution $h_s = s * H_s$ with the spatial filter $H_s$.

In embodiments, the temporal adaptation may, e.g., be incorporated by adding to $h_s$ a temporally high-pass filtered $h_t = s * H_t$:

$$\hat{a}_k = \max\left(a_{min}^2, \left(\frac{1}{4N^2} \cdot \sum_{[x,y] \in B_k} |h_{s_i}[x, y]| + \gamma |h_{t_i}[x, y]|\right)^2\right). \quad (6)$$

The $\hat{a}_k$ of formula (6) is visual activity information according to an embodiment. $\hat{a}_k$ may, e.g., be considered as temporal visual activity information.

In embodiments, the above equations (1)-(4), in particular, equation (2), are equally applicable for $a_k$ with $a_k$ being replaced by $\hat{a}_k$.

In embodiments, two temporal high-pass filters are advantageous.

The first one, a first-order FIR (finite impulse response) filter used for frame rates of 30 Hz or less (e. g., 24, 25, and 30 frames per second), is given by $$h_{t_i}[x,y] = s_i[x,y] - s_{i-1}[x,y], \quad (7)$$

The second one, a second-order FIR filter used for frame rates higher than 30 Hz (e. g., 48, 50 and 60 frames per second), is given by $$h_{t_i}[x,y] = s_i[x,y] - 2s_{i-1}[x,y] + s_{i-2}[x,y]. \quad (8)$$

In other words, one or two prior frame inputs are used to determine a measure of the temporal activity in each block $B_k$ of each frame s over time.

The relative weighting parameter $\gamma$ is a constant which can be determined experimentally. For example, $\gamma=2$. In order to compensate for the increased sample variance in $a_k$ due to the introduction of $|h_t|$, for example, $w_k$ is modified:

$$\hat{w}_k = \left(\frac{\hat{a}_{pic}}{\hat{a}_k}\right)^\beta \text{ with } \hat{a}_{pic} = 2^{(BD+1)} \cdot \sqrt{\frac{3840 \cdot 2160}{W \cdot H}}. \quad (9)$$

It is worth noting that the temporal activity component in $\hat{a}_k$ introduced here is a relatively crude (but very low-complexity) approximation of the block-wise motion estimation algorithms found in all modern video codecs. Naturally, more sophisticated (but computationally more complex) temporal activity measures that account for block-internal motion between frames i, i−1 and, if applicable, i−2 before applying the temporal filter $h_t$ in i may be devised [12], [13]. Such extensions are not used here due to high algorithmic complexity.

In the following, changes for Temporally Varying Video Quality according to embodiments are provided.

As already outlined, for video sequences, the conventional approach is to average the individual frame PSNR (or WPSNR) values to obtain a single measurement value for the entire sequence. For compressed video material which strongly varies in visual quality over time, this form of averaging the frame-wise metric output may not correlate well with MOS values given by human observers, especially non-experts. Averaging of the logarithmic (W)PSNR values appears to be particularly suboptimal on video content of high overall visual quality in which, however, some brief temporal segments exhibit low quality. Since the introduction of rate adaptive video streaming, such scenarios are actually not that uncommon. It has been experimentally discovered that non-expert viewers, under such circumstances, assign relatively low scores during video quality assessment tasks, even if most frames of the compressed video are of excellent quality to their eyes. As a result, log-domain averaged WPSNRs often overestimate the visual quality in such cases.

A solution to this problem is to average the frame-wise weighted distortions determined during the $WPSNR_{c,s}$ calculations (i. e., the denominator in equation (1)) instead of the $WPSNR_{c,s}$ values themselves:

$$WPSNR'_c = 10 \cdot \log_{10}\left(\frac{F \cdot W \cdot H \cdot (2^{BD}-1)^2}{\sum_{i=1}^{F}\left(\sum_{k \in i}\left(w_k \cdot \sum_{[x,y] \in B_k}(s_{c,i}[x,y]-s_i[x,y])^2\right)\right)}\right), \quad (10)$$

Figure 2:
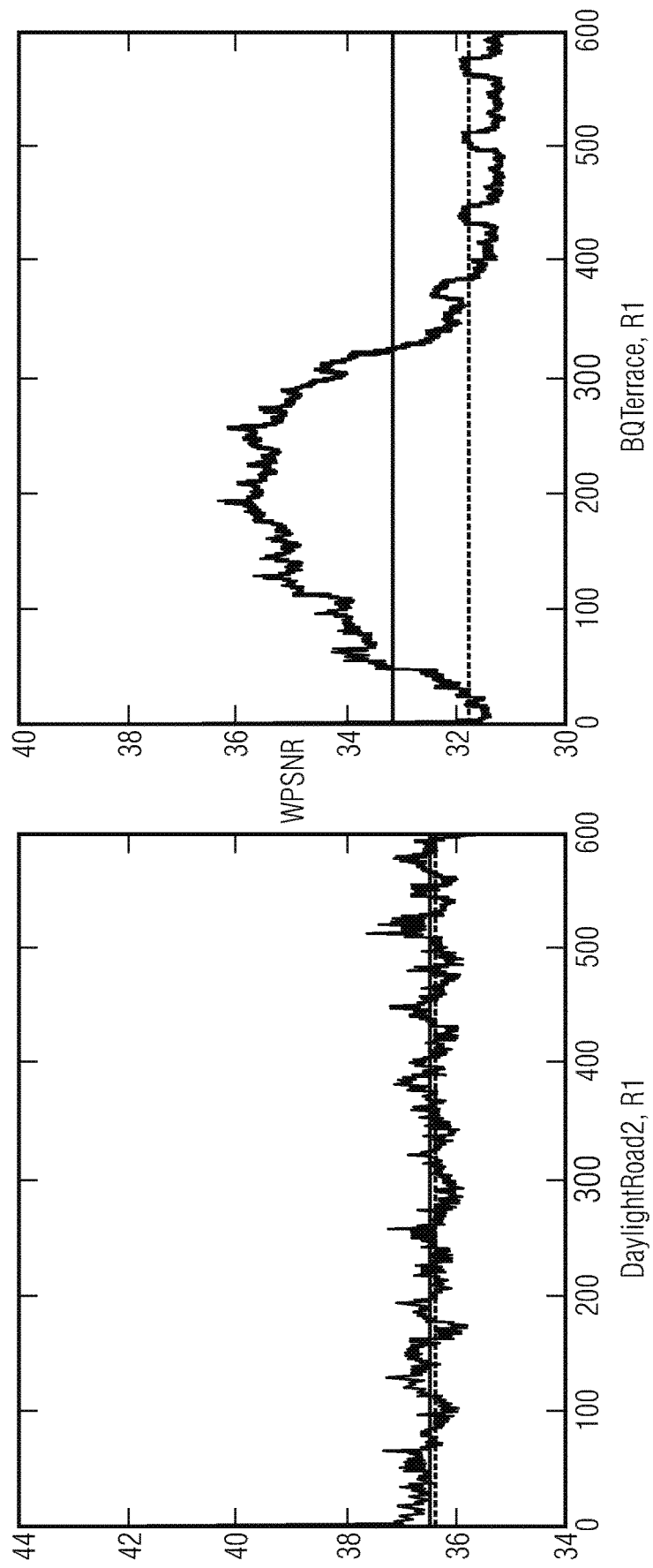
FIG. 2 illustrates an effect of different WPSNR averaging concepts across frames.

FIG. 2 illustrates an effect of different WPSNR averaging concepts across frames (horizontal). Non-constant line: frame-wise WPSNR values, Constant line: conventional log-domain averaging: proposed linear-domain (distortion) averaging.

In particular, FIG. 2 illustrates the benefit of the above linear-domain arithmetic averaging over the conventional log-domain averaging (which is equivalent to a geometric averaging across the frames in linear domain). For sequences with relatively constant frame WPSNRs, shown on the left side, the averaging methods result in very similar outputs. On videos with varying frame quality, shown on the right side, comparatively low frame WPSNRs (caused by relatively high frame distortions) dominate the average more in the linear than in the log-domain averaging. This leads to slightly lower and, typically, not overestimated overall WPSNR values, as desired.

A weighted averaging of the linear-domain (arithmetic) and the log-domain (geometric) WPSNR averages may also be used to obtain overall measurements lying between the two output values (e. g., 31.8 and 33.2 dB in the right-hand graphic in FIG. 2). Specifically, the overall WPSNR average may be given by $$WPSNR''_c = \delta \cdot \left(\frac{1}{F} \cdot \sum_{i=1}^{F} WPSNR_{c,s_i}\right) + (1-\delta) \cdot WPSNR'_c, \quad (11)$$

where $WPSNR'_c$ represents the linear-domain average and $0 \leq \delta \leq 1$ denotes the linear-vs-log weighting factor. This approach adds one more degree of freedom in the WPSNR calculation, which can be used to maximize the correlation between the $WPSNR''_c$ values and experimental MOS results.

Another alternative approach is to utilize a "square mean root" [14] distortion in the derivation of $WPSNR'_c$:

$$WPSNR^{smr}_c = 20 \cdot \log_{10}\left(\frac{F \cdot \sqrt{W \cdot H} \cdot (2^{BD}-1)}{\sum_{i=1}^{F}\sqrt{\sum_{k \in i}\left(w_k \cdot \sum_{[x,y] \in B_k}(s_{c,i}[x,y]-s_i[x,y])^2\right)}}\right). \quad (12)$$

The 20 (instead of 10) at the beginning of the equation, which "undoes" the power-of-0.5 square roots. This form of calculating average video WPSNR data yields results lying between the abovementioned log-domain and linear-domain solutions and can closely approximate the $WPSNR''_c$ results when weight $\delta=0.5$, or weight $\delta\approx0.5$.

In the following, changes for Very High-Resolution Video Content according to embodiments are provided.

It was observed that, particularly for ultra-high-definition (UHD) video sequences with a resolution greater than, say, 2048×1280 luminance samples, the original WPSNR approach of [6], [7], [8], [9] and [11] still correlates quite poorly with subjective MOS data, e. g., on JVET's Call for Proposals data set [10]. In this regard, the WPSNR performs only marginally better than the traditional PSNR metric. One possible explanation is that UHD videos are typically viewed on similar screen sizes as lower-resolution high-definition content having only, e. g., 1920×1080 (HD) or 2048×1080 (2K) luma samples. In conclusion, the samples of UHD videos are displayed smaller than those of (up-scaled) HD or 2K videos, a fact which should be taken into account during the visual activity calculation in the WPSNR algorithm, as described above.

A solution to the abovementioned problem is to extend the support of the spatial high-pass filter $H_s$ such that it extends across more neighboring samples of $s[x, y]$. Given that, in [7], [9], [11], for example:

$$H_s = \begin{bmatrix} -1 & -2 & -1 \\ -2 & 12 & -2 \\ -1 & -2 & -1 \end{bmatrix} \quad (13)$$

or a scaled version thereof (multiplied by ¼ in [9]), an approach would be to upsample $H_S$ by a factor of two, i. e., to increase its size from 3×3 to 6×6 or even 7×7. This would, however, increase the algorithmic complexity of the spatio-temporal visual activity calculation considerably. Hence, an alternative solution is chosen in which the visual activity $â_k$ on a downsampled version of the input frame sequence $s_{i-2}$, $s_{i-1}$, $s_i$ is determined, if the input image or video is larger than 2048×1280 luminance samples. In other words, only a single value of $h_{s_i}[x, y]$ and, optionally for videos, a single value of $h_{t_i}[x, y]$ may be calculated for multiple samples of $s_i$, e. g., for each quadruple of samples of $s_i$. This approach has been applied in a number of quality metrics, most prominently the MS-SSIM [2]. It is worth noting, though, that in the context of this study, the downsampling and high-pass operations can be unified into one process by designing the high-pass filters appropriately, thus achieving minimal algorithmic complexity. For example, using the following filters:

$$\check{h}_{s_i}[x,y] = s_i[x,y] * \check{H}_s, \check{H}_s = \begin{bmatrix} -1 & -1 & -2 & -2 & -1 & -1 \\ -1 & -1 & -2 & -2 & -1 & -1 \\ -2 & -2 & 12 & 12 & -2 & -2 \\ -2 & -2 & 12 & 12 & -2 & -2 \\ -1 & -1 & -2 & -2 & -1 & -1 \\ -1 & -1 & -2 & -2 & -1 & -1 \end{bmatrix} \quad (14)$$

or $$\check{h}_{s_i}[x,y] = s_i[x,y] * \check{H}_s, \check{H}_s = \begin{bmatrix} 0 & -1 & -1 & -1 & -1 & 0 \\ -1 & -2 & -3 & -3 & -2 & -1 \\ -1 & -3 & 12 & 12 & -3 & -1 \\ -1 & -3 & 12 & 12 & -3 & -1 \\ -1 & -2 & -3 & -3 & -2 & -1 \\ 0 & -1 & -1 & -1 & -1 & 0 \end{bmatrix}, \quad (15)$$

$$\check{h}_{t_i}[x,y] = \check{s}_i[x,y] - \check{s}_{i-1}[x,y] \text{ or} \quad (16)$$

$$\check{h}_{t_i}[x,y] = \check{s}_i[x,y] - 2\check{s}_{i-1}[x,y] + \check{s}_{i-1}[x,y],$$

where denotes the downsampling and $$\check{s}_i[x,y] = s_i[x,y] + s_i[x+1,y] + s_i[x,y+1] + s_i[x+1,y+1]. \quad (17)$$

Figure 3:
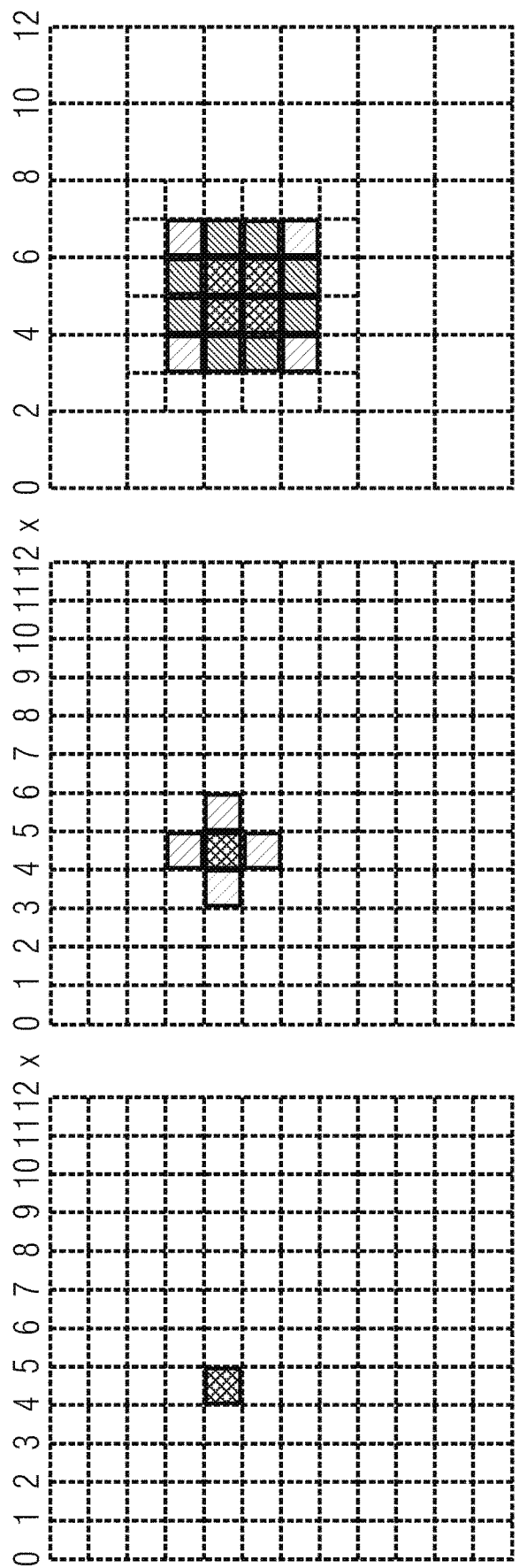
FIG. 3 illustrates sample-wise high-pass filtering of input signal s without and with spatial downsampling of s during the filtering.

Using $\check{s}_i[x, y]$, spatio-temporal activity values needed for the derivation of $\hat{a}_k$ (or $a_k$ for still-image input) need to be determined only for the even values of x and y, i. e., every fourth value of the input sample set s. This particular benefit of the proposed downsampled high-pass operation is illustrated in FIG. 3. Otherwise, the calculation of $\hat{a}_k$ (or $a_k$), as described above, may, e.g., remain identical (incl. division by $4N^2$).

It should be emphasized that the downsampling process is only applied temporarily during the calculation of the block-wise spatio-temporal visual activity $\hat{a}_k$ (or $a_k$ for single still images). The distortion sum assessed by the WPSNR metric (i. e., $\Sigma_{[x,y] \in B_k}(s_c[x, y] - s[x, y])^2$ in the above equations) is still determined at the input resolution without any downsampling, regardless of whether the input is of UHD, HD, or smaller size.

FIG. 3 illustrates sample-wise high-pass filtering of input signal s (left) without (center) and with (right) spatial downsampling of s during the filtering. When downsampling, 4 inputs are mapped to one high-pass output.

In the following, further embodiments are described that determine a quantization parameter for video encoding.

Moreover, a video encoder is provided that encodes a video sequence comprising a plurality of video frames depending on a quantization parameter, wherein the quantization parameter is determined depending on visual activity information. Furthermore, a corresponding decoder, computer program and data stream is provided.

An apparatus for varying a coding quantization parameter across a picture according to an embodiment is provided, which comprises an apparatus 100 for determining visual activity information as described above.

The apparatus for varying the coding quantization parameter across the picture is configured to determine a coding quantization parameter for the predetermined block depending on the visual activity information.

In an embodiment, the apparatus for varying the coding quantization parameter may, e.g., be configured to, in determining the coding quantization parameter, subject the visual activity information to logarithmization.

Moreover, an encoder for encoding a picture into a data stream is provided. The encoder comprises an apparatus for varying a coding quantization parameter across the picture as described above, and an encoding stage configured to encode the picture into the data stream using the coding quantization parameter.

In an embodiment, the encoder may, e.g., be configured to encode the coding quantization parameter into the data stream.

In an embodiment, the encoder may, e.g., be configured to subject the coding quantization parameter to two-dimensional median filtering.

In an embodiment, the encoding stage may, e.g., be configured to obtain a residual signal using the picture and using predictive coding and encode into the data stream the residual signal using the coding quantization parameter.

In an embodiment, the encoding stage may, e.g., be configured to encode the picture into the data stream using predictive coding to obtain a residual signal, quantize the residual signal using the coding quantization parameter, and encode the quantized residual signal into the data stream.

In an embodiment, the encoding stage may, e.g., be configured to, in encoding the picture into the data stream, adapt a Lagrangian rate-distortion parameter depending on the coding quantization parameter.

In an embodiment, the apparatus for varying the coding quantization parameter may, e.g., be configured to perform the variation of the coding quantization parameter based on an original version of the picture.

In an embodiment, the encoding stage may, e.g., support one or more of
  block-wise switching between transform-domain and spatial-domain prediction residual coding;
  block-wise prediction residual coding at block sizes having multiple-of-four horizontal and vertical dimensions;
  determining and encoding in-loop filter coefficients into the data stream.

In an embodiment, the apparatus for varying the coding quantization parameter may, e.g., be configured to encode the coding quantization parameter into the data stream in logarithmic domain and the encoding engine is configured to, in encoding the picture using the coding quantization parameter, apply the coding quantization parameter in a manner where the coding quantization parameter acts as a divisor for a signal to be quantized prior to quantization in non-logarithmic domain.

Moreover, a decoder for decoding a picture from a data stream is provided.

The decoder comprises an apparatus for varying a coding quantization parameter across the picture as described above, and a decoding stage configured to decode the picture from the data stream using the coding quantization parameter.

The decoding stage is configured to decode from the data stream a residual signal, dequantize the residual signal using the coding quantization parameter and decode the picture from the data stream using the residual signal and using predictive decoding.

In an embodiment, the apparatus for varying the coding quantization parameter may, e.g., be configured to perform the variation of the coding quantization parameter based on a version of the picture reconstructed from the data stream by the decoding stage.

In an embodiment, the decoding stage may, e.g., support one or more of
  block-wise switching between transform-domain and spatial-domain prediction residual coding;

block-wise prediction residual decoding at block sizes having multiple-of-four horizontal and vertical dimensions;

decoding in-loop filter coefficients from the data stream.

In an embodiment, the apparatus for varying the coding quantization parameter may, e.g., be configured to determine the coding quantization parameter depending on the predicted dispersion in logarithmic domain and the decoding engine is configured to, in decoding the picture using the coding quantization parameter, transfer the coding quantization parameter from the logarithmic domain to non-logarthmic domain by exponentiation and apply the coding quantization parameter in the non-logarithmic domain as a factor to scale a quantized signal transmitted by the data stream.

Moreover, a data stream having a picture encoded thereinto by an encoder as described above is provided.

In the following, particular embodiments are described in more detail.

All contemporary perceptual image and video transform coders apply a quantization parameter (QP) for rate control which, in the encoder, is employed as a divisor to normalize the transform coefficients prior to their quantization and, in the decoder, to scale the quantized coefficient values for reconstruction. In High Efficiency Video Coding (HEVC) as specified in [8], the QP value is coded either once per image or once per N×N block, with N=8, 16, 32, or 64, on a logarithmic scale with a step-size of roughly one dB:

Encoder: $q=\text{round}(6 \log_2(QP)+4)$, Decoder:
$$QP'=2^{(q-4)/6}, \quad (18)$$

where q is the coded QP index and ' indicates the reconstruction. Notice that QP' is also utilized in the encoder-side normalization to avoid any error propagation effects due to the QP quantization. The present embodiment adjusts the QP locally for each 64×64-sized coding tree unit (CTU, i. e., N=64) in case of images and videos with a resolution equal to or less than Full High Definition (FHD, 1920×1080 pixels), or for each 64×64 or 128×128-sized block in case of greater-than-FHD resolution (e. g., 3840×2160 pixels).

Now, the squares of the above-determined visual activity information, e.g., the $â_k$ determined, for example, according to equation (6), are averaged across the entire picture (or slice, in case of HEVC). For example, in a FHD picture, e.g., 510 per-$B_k$ (per-block) $â_k$ values, are averaged when N=64. Using $$L(\bullet)=\lfloor c \log_2(\bullet) \rfloor \text{ with constant } c=2 \text{ in HEVC} \quad (19)$$

for logarithmic conversion, which can be implemented efficiently using table look-ups (see, e. g., [16] for a general algorithm), a QP offset $-q<o_b\leq 51-q$ for each block k can, finally, be determined:

$$o_b=o_k=L(â_k^2)-L(\text{avg}(â_k^2)) \quad (20a)$$

In HEVC, this CTU-wise offset is added to the default slice-wise QP index q, and QP' for each CTU is obtained from (1).

Alternatively, assuming that the overall multiplier λ for a picture is associated with the overall QP for said picture, the QP assignment rule is obtained, e.g., according to:

$$o_b = o_k = -\left\lfloor 3 \cdot \log_2 \frac{\lambda}{\lambda_k} \right\rfloor = -\lfloor 3 \cdot \log_2 w_k \rfloor \quad (20b)$$

where the half-squared brackets indicate rounding. At this point, it is noted that it may, e.g., be advantageous to scale the weighting factors $w_k$ in a way that their average across a picture, or a set of pictures or video frames, is close to 1. Then, the same relationship between the picture/set Lagrange parameter λ and the picture/set QP as for unweighted SSE distortion can be used.

Note that, to slightly reduce the delta-QP side-information rate, it was found to be advantageous to apply two-dimensional median filtering to the resulting matrix of q+$o_b$ sums transmitted to the decoder as part of the coded bit-stream. In the embodiment, a three-tap cross-shaped kernel, i. e., a filter computing the median for a value from that value and its immediate vertical and horizontal neighbors, similar to the high-pass filter of (1), is used. Moreover, in each CTU, the rate-distortion parameter $\lambda_b=\lambda_k$ may, e.g., to be updated according to q+$o_b$ to maximize the coding efficiency $$\lambda'_b=2^{o_b/3} \text{ or, when median filtering,}$$
$$\lambda_b \cdot 2^{(\text{median}(q+o_b)-q)/3}. \quad (21)$$

In [15], edge blocks were classified into a separate category and quantized using dedicated custom parameters in order to prevent a noticeable increase in quantization-induced ringing effects around straight directional lines or object borders. When using the current embodiment in the context of HEVC, no such effects can be observed even though no comparable classification is performed. The most likely reason for this property is the increased efficiency of HEVC over the MPEG-2 standard used in [15] with regard to edge coding. Most notably, HEVC supports smaller 4×4 blocks, with optional transform skipping for quantization directly in the spatial domain, as well as a Shape Adaptive Offset (SAO) post-filtering operation to reduce banding and ringing effects during decoding [8, 10].

Thanks to the incorporation of the picture-averaged avg ($â_k^2$) and avg($â_k^2$) in (6), the average coding bit-rate, when measured across a diverse set of input material, does not increase significantly due to the application of the QP adaptation proposal. In fact, for q=37 and similar nearby values, the mean bit-stream rate was found not to change at all when employing the QP adaptation. This property can, therefore, be regarded as a second advantage of the present embodiment, aside from its low computational complexity.

It should be emphasized that the present embodiment can easily be extended to non-square coding blocks. As should be evident to those skilled in the art, unequal horizontal and vertical block/CTU sizes can be accounted for in (2-4) by replacing all occurrences of (here: divisions by) $N^2$ with (divisions by) $N_1 \cdot N_2$, where the subscripts 1 and 2 denote the horizontal and vertical block dimensions.

After having described first embodiments visual activity information of a block to control the coding quantization parameter for this block, a corresponding embodiment is described in the following with respect to FIG. 4 which shows an apparatus for varying or adapting a coding quantization parameter across a picture and its possible applicability in an encoder for encoding a picture, but this time the details presented above are generalized and although the embodiment of FIG. 4 may be implemented as a modification of a HEVC codec as it has been the case above, this needs not to be necessarily the case as outlined in more detail below.

Figure 4:
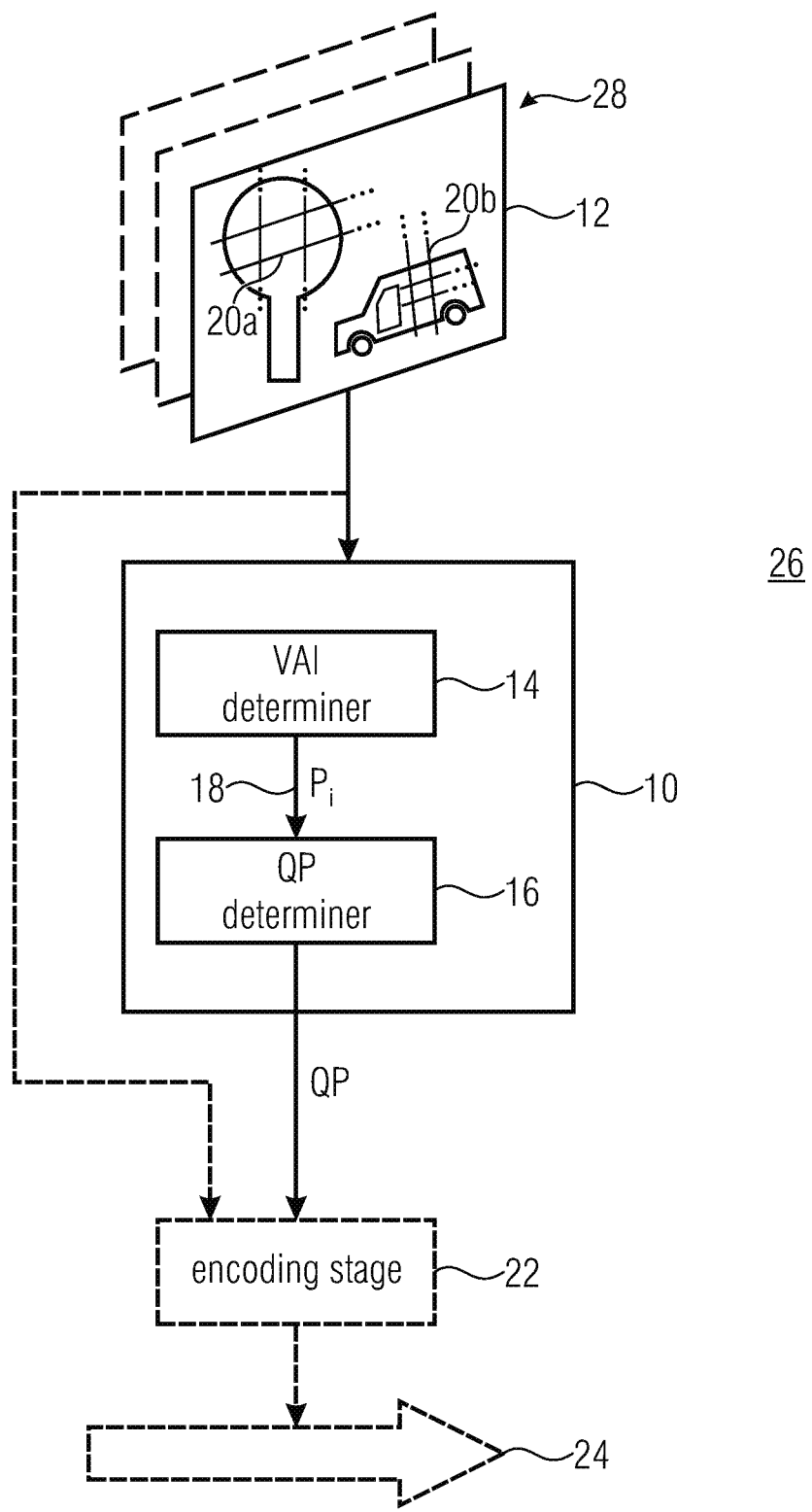
FIG. 4 shows the apparatus for varying the coding quantization parameters QP across a picture as comprising a visual activity information determiner and a QP determiner.

FIG. 4 shows the apparatus 10 for varying the coding quantization parameters QP across a picture 12 as comprising a visual activity information determiner (VAI determiner) 14 and a QP determiner 16. The visual activity information determiner determines visual activity information of a predetermined block of picture 12. The visual activity information determiner 14 computes the visual activity information $\hat{a}_k$, for instance, using equation (6). Further, as also discussed above, the visual activity information determiner 14 may subject the predetermined block to the high-pass filtering first followed by the determination of the visual activity information 18. The visual activity information determiner 14 may alternatively use other equations instead of equation (6) by varying some of the parameters used in equation (6).

The QP determiner 16 receives the visual activity information 18 and, depending thereon, determines the quantization parameter QP. As described above, the QP determiner 16 may subject the visual activity information received from visual activity information determiner 14 to logarithmization such as indicated in equation 5 although any other transition to logarithmic domain may be used alternatively. The QP determiner 16 may apply a logarithmization to the low-pass filter domain visual activity information. The determination by QP determiner 16 may also involve a rounding or a quantization, i.e., a rounding of the visual activity information in logarithmic domain, for instance.

The mode of operation of visual activity information determiner 14 and QP determiner 16 has been discussed above with respect to a certain predetermined block of picture 12. Such a predetermined block is exemplarily indicated in FIG. 4 at 20a, for instance. In the manner just-outlined, determiner 14 and determiner 16 act on each of a plurality of blocks picture 12 is composed of, thereby achieving the QP variation/adaption across picture 12, i.e., the adaptation of the quantization parameter QP to the picture content so as to be adapted to the human visual system, for instance.

Due to this adaptation, the resulting quantization parameter may advantageously be used by an encoding stage 22 receiving the corresponding quantization parameter QP in order to encode the corresponding block of picture 12 into a data stream 24. Accordingly, FIG. 4 exemplary shows as to how apparatus 10 may be combined with an encoding stage 22 so as to result into an encoder 26. The encoding stage 22 encodes picture 12 into a data stream 24 and uses, to this end, the quantization parameter QP varied/adapted by apparatus 10 across picture 12. That is, within each block, which picture 12 is composed of, encoding stage 22 uses the quantization parameter as determined by QP determiner 16.

For sake of completeness, it should be noted that the quantization parameter used by encoding stage 22 to encode picture 12 may not solely be determined by QP determiner 16. Some rate control of encoding stage 22, for instance, may cooperate to determine the quantization parameter such as, for instance, by determining $QP_q$ while the contribution by QP determiner 16 may end-up into QP offset $0_b$. As shown in FIG. 4, encoding stage 22 may, for instance, code the quantization parameter into data stream 24. As described above, a quantization parameter may be coded into data stream 24 for the corresponding block such as block 20a in logarithmic domain. The encoding stage 22, in turn, may apply the quantization parameter in the non-logarithmic domain, namely in order to normalize the signal to be coded into data stream 24 by using the quantization parameter in non-logarithmic or linear domain as a divisor applied to the respective signal. By this measure, the quantization noise resulting from the quantization by encoding stage 22 is controlled across picture 12.

The encoding of the quantization parameter into the data stream 24 may, as discussed above, be made as differences to a base quantization parameter of larger scope globally determined, for instance, for picture 12 or slices thereof, i.e., in form of offsets $O_b$ and the coding may involve entropy coding and/or differential or predictive coding, merging or similar concepts.

Figure 5:
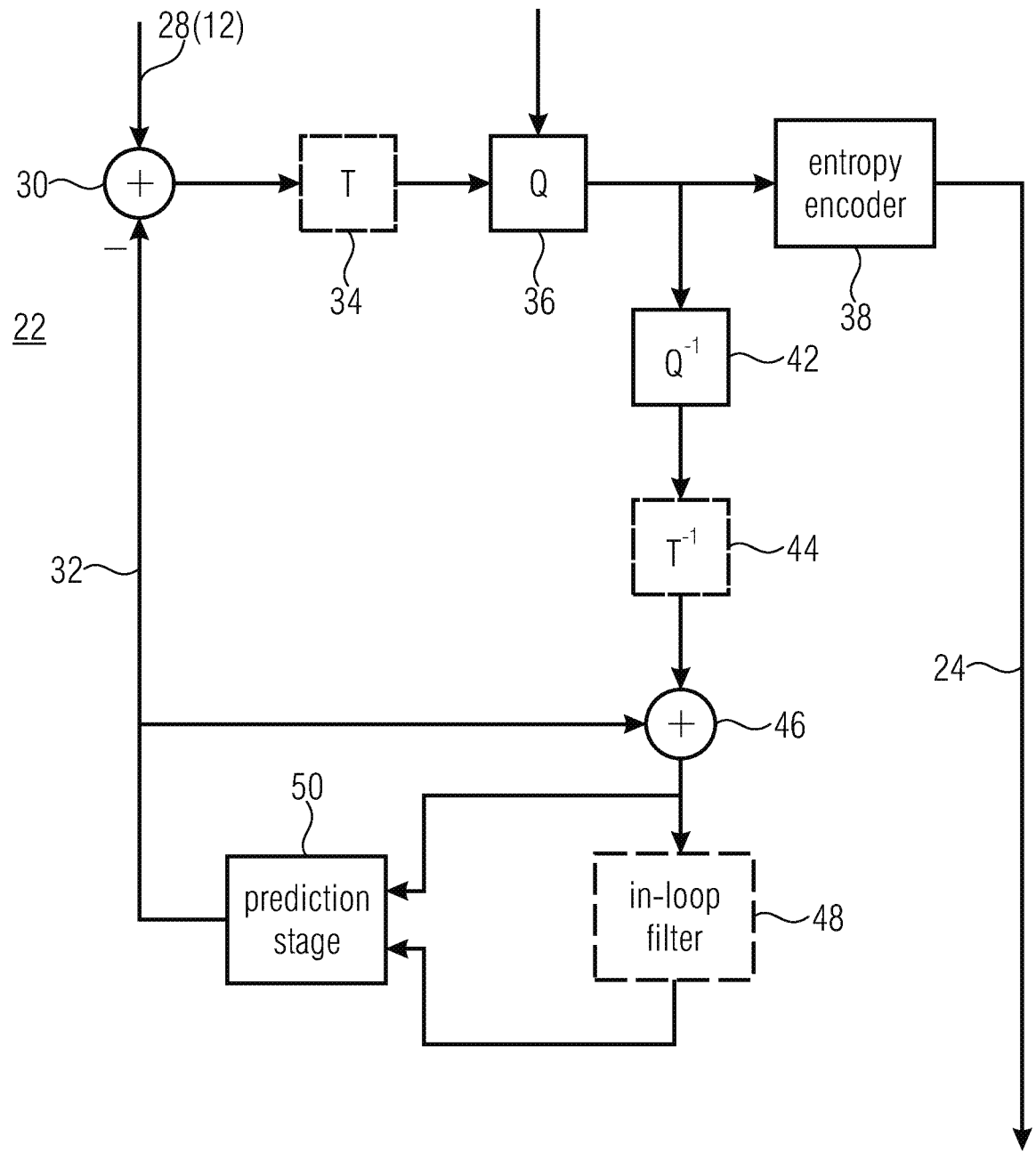
FIG. 5 shows a possible structure of encoding stage.

FIG. 5 shows a possible structure of encoding stage 22. In particular, FIG. 4 relates to the case where encoder 26 of FIG. 4 is a video coder with picture 12 being one picture out of a video 28. Here, the encoding stage 22 uses hybrid video coding. Encoding stage 22 of FIG. 5 comprises a subtractor 30 to subtract a prediction signal 32 from the signal to be coded, such as picture 12. In a concatenation of an optional transform stage 34, a quantizer 36 and entropy coder 38 are connected in the order of their mentioning to the output of subtractor 30. Transformation stage 34 is optional and may apply a transformation, such as s spectrally decomposing transformation, onto the residual signal output by subtractor 30 and quantizer 36 quantizes the residual signal in transform domain or in spatial domain on the basis of the quantization parameter as varied or adapted by apparatus 10. The thus quantized residual signal is entropy encoded into the data stream 24 by entropy encoder 38. A concatenation of a dequantizer 42 followed by an optional inverse transformer 44 reverses or performs the inverse of the transform and quantization of modules 34 and 36 so as to reconstruct the residual signal as output by subtractor 30 except for the quantization errors occurring owing to the quantization by quantizer 36. An adder 46 adds the reconstructed residual signal and the prediction signal 32 to result into a reconstructed signal. An in-loop filter 48 may optionally be present in order to improve the quality of completely reconstructed pictures. A prediction stage 50 receives reconstructed signal portions, i.e., already reconstructed portions of a current picture and/or already reconstructed previously coded pictures, and outputs the prediction signal 32.

FIG. 5, thus, renders clear that the quantization parameter as varied or adapted by apparatus 10 may be used in the encoding stage 22 so as to quantize a prediction residual signal. The prediction stage 50 may support different prediction modes such as an intra prediction mode according to which prediction blocks are spatially predicted from already coded portions, and an inter prediction mode according to which a prediction block is predicted on the basis of already coded pictures such as a motion-compensative prediction mode. It should be noted that the encoding stage 22 may support switching on/off the residual transform by transformation stage 34 and the corresponding inverse transformation by inverse transformer 44 in units of residual blocks, for instance.

And further, it should be noted that the block granularities mentioned may differ: the blocks at which the prediction mode is varied, the blocks at which prediction parameters for controlling the respective prediction mode are set and transmitted in data stream 24, the blocks at which transformation stage 34 performs individual spectral transforms, for instance, and finally, the blocks 20a and 20b at which the quantization parameter is varied or adapted by apparatus 10 may mutually differ or at least some may differ mutually. For instance, and as exemplified in the above example with respect to HEVC, the sizes of blocks 20a and 20b at which the quantization parameter variation/adaptation by apparatus 10 is performed, may be more than four times larger than a smallest block size at which the transforms by transformation stage 34 are performed when the spectral transform may, for instance, be a DCT, DST, KLT, FFT or a Hadamard transform. It may alternatively even be larger than eight times the minimum transform block size. As indicated above, the in-loop filter 48 may be an SAO filter [17].

Alternatively, an ALF filter may be used [18]. Filter coefficients of the in-loop filter may be coded into data stream 24.

Finally, as has already been indicated above, the QPs as output by apparatus 10 may be coded into the data stream in a manner having passed some two-dimensional median filtering so as to lower the needed data rate.

FIG. 6 shows a possible decoder 60 configured to decode from data stream 24, a reconstructed version 62 of video 28 and/or picture 12. Internally, this decoder comprises an entropy decoder 64 at the input of which the data stream 24 enters, followed by modules shown, and interconnected to each other in a manner shown, with respect to FIG. 6 so that the same reference signs have been used in FIG. 6 again, with an apostrophe, however, in order to indicate their presence in decoder 60 instead of encoder stage 22. That is, at the output of adder 46' or, optionally, the output of in-loop filter 48' the reconstructed signal 62 was obtained. Generally speaking, a difference between modules of encoding stage 22 of FIG. 5 and decoder 60 of FIG. 6 relies on the fact the encoding stage 22 determines or sets in accordance with some optimization scheme using, for instance, a Lagrangian cost function, depending on rate and distortion, the prediction parameters, prediction modes, the switching between residual transform of remaining and spatial domain for residual coding and so forth. Via data stream 24, the quantizer 42' obtains the quantization parameter variation/adaptation favorably chosen by apparatus 10. It uses the quantization parameter in the non-logarithmic domain as a factor in order to scale the quantized signal, namely the quantized residual signal obtained by entropy decoder 64 from data stream 24. The just-mentioned Lagrangian cost function may involve a Lagrangian rate/distortion parameter which is a factor applied to the coding rate with the corresponding product being added to the distortion to result into the Lagrangian cost function. This Lagrangian rate/distortion parameter may be adapted by the encoding stage 22 depending on the coding quantization parameter.

It should be noted that above and in the following, the term "coding" indicates the source coding of still or moving pictures. However, the present aspect of determining a visual coding quality value according to the invention is equally applicable to other forms of coding, most prominently, channel coding which may cause perceptually similar forms of visible distortion (e.g., frame error concealment (FEC) artifacts caused by activation of FEC algorithms in case of network packet loss).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Z. Wang, A. C. Bovik, H. R. Sheikh, and E. P. Simoncelli, "Image Quality Assessment: From Error Visibility to Structural Similarity," *IEEE Trans. Image Process.*, vol. 13, no. 4, pp. 600-612, April 2004.

[2] Z. Wang, E. P. Simoncelli, and A. C. Bovik, "Multiscale Structural Similarity for Image Quality assessment," in *Proc. IEEE 37th Asilomar Conf. on Signals, Systems, and Computers*, November 2003.

[3] Netflix, "VMAF—Video Multimethod Assessment Fusion," online: https://github.com/Netflix/vmaf, https://medium.com/netflix-techblog/toward-a-practical-perceptual-video-quality-metric-653f208b9652.

[4] P. Philippe, W. Hamidouche, J. Fournier, and J. Y. Aubié, "AHG4: Subjective comparison of VVC and HEVC," Joint Video Experts Team, doc. JVET-O0451, Gothenburg, July 2019.

[5] Z. Li, "VMAF: the Journey Continues," in *Proc. Mile High Video workshop*, Denver, July 2019, online: http://mile-high.video/files/mhv2019/pdf/day1/1_08_Li.pdf.

[6] S. Bosse, C. Helmrich, H. Schwarz, D. Marpe, T. Wiegand, "Perceptually optimized QP adaptation and associated distortion measure," doc. JVET-H0047, Macau, October/December 2017.

[7] C. Helmrich, H. Schwarz, D. Marpe, T. Wiegand, "AHG10: Improved perceptually optimized QP adaptation and associated distortion measure," doc. JVET-K0206, Ljubljana, July 2018.

[8] C. Helmrich, H. Schwarz, D. Marpe, T. Wiegand, "AHG10: Clean-up and finalization of perceptually optimized QP adaptation method in VTM," doc. JVET-M0091, Marrakech, December 2018.

[9] J. Erfurt, C. Helmrich, S. Bosse, H. Schwarz, D. Marpe, T. Wiegand, "A Study of the Perceptually Weighted Peak Signal-to-Noise Ratio (WPSNR) for Image Compression," in *Proc. IEEE Int. Conf. on Image Processing (ICIP)*, Taipei, pp. 2339-2343, September 2019.

[10] V. Baroncini, "Results of Subjective Testing of Responses to the Joint CfP on Video Compression Technology with Capability beyond HEVC," doc. JVET-J0080, San Diego, April 2018.

[11] C. R. Helmrich, S. Bosse, M. Siekmann, H. Schwarz, D. Marpe, and T. Wiegand, "Perceptually Optimized Bit-Allocation and Associated Distortion Measure for Block-Based Image or Video Coding," in *Proc. IEEE Data Compression Conf. (DCC)*, Snowbird, pp. 172-181, March 2019.

[12] M. Barkowsky, J. Bialkowski, B. Eskofier, R. Bitto, and A. Kaup, "Temporal Trajectory Aware Video Quality Measure," *IEEE J. Selected Topics in Signal Processing*, vol. 3, no. 2, pp. 266-279, April 2009.

[13] K. Seshadrinatan and A. C. Bovik, "Motion Tuned Spatio-Temporal Quality Assessment of Natural Videos," *IEEE Trans. Image Processing*, vol. 19, no. 2, pp. 335-350, February 2010.

[14] D. McK. Kerslake, *The Stress of Hot Environments*, p. 37, Cambridge University Press, 1972, online: https://books.google.de/books?id=FQo9AAAAIAAJ&pg=PA37&lpg=PA37&dq=%22square+mean+root %22&q=%22square %20mean %20root %22&f=false#v=snippet&q=%22square %20mean %20root %22&f=false.

[15] W. Osberger, S. Hammond, and N. Bergmann, "An MPEG Encoder Incorporating Perceptually Based Quantisation," in *Proc. IEEE Annual Conf. Speech & Image Technologies for Comput. & Telecomm.*, Brisbane, vol. 2, pp. 731-734, 1997.

[16] S. E. Anderson, "Bit Twiddling Hacks," Stanford University, 2005. http://graphics.stanford.edui~seander/bithacks.html

[17] C.-M. Fu, E. Alshina, A. Alshin, Y. Huang, C. Chen, C. Tsai, C. Hsu, S. Lei, J. Park, and W.-J. Han, "Sample Adaptive Offset in the HEVC Standard," *IEEE Trans. Circuits & Syst. for Video Technology*, vol. 22, no. 12, pp. 1755-1764, December 2012.

[18] C.-Y. Tsai, C.-Y. Chen, T. Yamakage, I. S. Chong, Y.-W. Huang, C.-M. Fu, T. Itoh, T. Watanabe, T. Chujoh, M. Karczewicz, and S.-M. Lei, "Adaptive Loop Filtering for Video Coding," *IEEE J. Selected Topics in Signal Process.*, vol. 7, no. 6, pp. 934-945, December 2013.

The invention claimed is:

1. Apparatus for determining visual activity information for a predetermined picture block of a video sequence comprising a plurality of video frames, the plurality of video frames comprising a current video frame and one or more timely-preceding video frames, wherein the one or more timely-preceding video frames precede the current video frame in time, wherein the apparatus is configured to receive the predetermined picture block of each of the one or more timely-preceding video frames and the predetermined picture block of the current video frame, determine the visual activity information depending on the predetermined picture block of the current video frame and depending on the predetermined picture block of each of the one or more timely-preceding video frames and depending on a temporal high-pass filter, wherein the apparatus is configured to determine the visual activity information depending on a spatial high-pass filter and/or the temporal high-pass filter;

wherein the apparatus is configured to downsample the predetermined picture block of the current video frame to acquire a downsampled picture block, and to apply the spatial high-pass filter and/or the temporal high-pass filter on each of a plurality of picture samples of the downsampled picture block, or wherein the apparatus is configured to apply the spatial high-pass filter and/or the temporal high-pass filter on only a first group of the plurality of picture samples of the predetermined picture block, but not on a second group of the plurality of picture samples of the predetermined picture block;

wherein the apparatus is configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an even row index and which are located in a column with an even column index, but not on the second group of the plurality of picture samples of the predetermined picture block, comprising exactly those of the plurality of picture samples of the predetermined picture block which are located in a row with an odd row index and/or which are located in a column with an odd column index; or wherein the apparatus is configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an odd row index and which are located in a column with an odd column index, but not on the second group of the plurality of picture samples of the predetermined picture block, comprising exactly those of the plurality of picture samples of the predetermined picture block which are located in a row with an even row index and/or which are located in a column with an even column index; or wherein the apparatus is configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an odd row index and which are located in a column with an even column index, but not on the second group of the plurality of picture samples of the predetermined picture block, comprising exactly those of the plurality of picture samples of the predetermined picture block which are located in a row with an even row index and/or which are located in a column with an odd column index; or wherein the apparatus is configured to apply the spatial high-pass filter and/or the temporal high-pass filter on only the first group of the plurality of picture samples, the first group of the plurality of picture samples comprising exactly those of the plurality of picture samples of the predetermined picture block which are located in a row with an even row index and which are located in a column with an odd column index, but not on the second group of the plurality of picture samples of the predetermined picture block, comprising exactly those of the plurality of picture samples of the predetermined picture block which are located in a row with an odd row index and/or which are located in a column with an even column index; or wherein the spatial high-pass filter being applied on only the first group of the plurality of picture samples is defined according to:

$$\check{h}_{s_i}[x, y] = s_i[x, y] * \check{H}_s$$

wherein $$\check{H}_s = \begin{bmatrix} -1 & -1 & -2 & -2 & -1 & -1 \\ -1 & -1 & -2 & -2 & -1 & -1 \\ -2 & -2 & 12 & 12 & -2 & -2 \\ -2 & -2 & 12 & 12 & -2 & -2 \\ -1 & -1 & -2 & -2 & -1 & -1 \\ -1 & -1 & -2 & -2 & -1 & -1 \end{bmatrix}, \text{ or}$$

$$\check{H}_s = \begin{bmatrix} 0 & -1 & -1 & -1 & -1 & 0 \\ -1 & -2 & -3 & -3 & -2 & -1 \\ -1 & -3 & 12 & 12 & -3 & -1 \\ -1 & -3 & 12 & 12 & -3 & -1 \\ -1 & -2 & -3 & -3 & -2 & -1 \\ 0 & -1 & -1 & -1 & -1 & 0 \end{bmatrix},$$

wherein $s_i[x, y]$ indicates a picture sample of the first group.

2. Apparatus according to claim 1,
wherein the apparatus is configured to apply the temporal high-pass filter by combining a picture sample of the predetermined picture block of the current video frame and a picture sample of the predetermined picture block of each of the one or more timely-preceding video frames.

3. Apparatus according to claim 2,
wherein each of the picture samples of the predetermined picture block of the current video frame and of the picture samples of the predetermined picture block of each of the one or more timely-preceding video frames is a luminance value; or
wherein each of the picture samples of the predetermined picture block of the current video frame and of the picture samples of the predetermined picture block of each of the one or more timely-preceding video frames is a chrominance value; or
wherein each of the picture samples of the predetermined picture block of the current video frame and of the picture samples of the predetermined picture block of each of the one or more timely-preceding video frames is a red value or a green value or a blue value.

4. Apparatus according to claim 2,
wherein the one or more timely-preceding video frames are two or more timely-preceding video frames, and
wherein the apparatus is configured to apply the temporal high-pass filter by combining the picture sample of the predetermined picture block of the current video frame and the picture sample of the predetermined picture block of each of the two or more timely-preceding video frames.

5. Apparatus according to claim 2,
wherein the apparatus is configured to combine a spatially high-pass filtered version of the picture sample of the predetermined picture block of the current video frame and a temporally high-pass filtered picture sample, which results from applying the temporal high-pass filter by combining the picture sample of the predetermined picture block of the current video frame and the picture sample of the predetermined picture block of each of the one or more timely-preceding video frames.

6. Apparatus according to claim 1,
wherein the video sequence further comprises one or more timely-preceding video frames, wherein the one or more timely-preceding video frames precede the current video frame in time,
wherein the apparatus is configured to receive the predetermined picture block of each of the one or more timely-preceding video frames,
wherein the apparatus is configured to determine the visual activity information further depending on the predetermined picture block of each of the one or more timely-preceding video frames and depending on a temporal high-pass filter,
wherein the apparatus is configured to downsample the predetermined picture block of the current video frame to acquire a downsampled picture block, and to apply a spatial high-pass filter and/or the temporal high-pass filter on each of a plurality of picture samples of the downsampled picture block, or wherein the apparatus is configured to apply the spatial high-pass filter and/or the temporal high-pass filter on only a first group of the plurality of picture samples of the predetermined picture block, but not on a second group of the plurality of picture samples of the predetermined picture block.

7. An apparatus for determining visual activity information according to claim 1,
wherein the apparatus is configured for varying a coding quantization parameter across a picture,
wherein the apparatus is configured to determine a coding quantization parameter for the predetermined block depending on the visual activity information.

8. An apparatus according to claim 7,
wherein the apparatus implements an encoder for encoding a picture into a data stream,
wherein the apparatus comprises an encoding stage configured to encode the picture into the data stream using the coding quantization parameter.

9. An apparatus according to claim 7,
wherein the apparatus implements a decoder for decoding a picture from a data stream,
wherein the apparatus comprises a decoding stage configured to decode the picture from the data stream using the coding quantization parameter.

10. A non-transitory digital storage medium having stored thereon a data stream having a picture encoded thereinto by an apparatus according to claim 8.

11. Apparatus for determining visual activity information for a predetermined picture block of a video sequence comprising a plurality of video frames, the plurality of video frames comprising a current video frame and one or more timely-preceding video frames,
wherein the one or more timely-preceding video frames precede the current video frame in time,
wherein the apparatus is configured to
receive the predetermined picture block of each of the one or more timely-preceding video frames and the predetermined picture block of the current video frame,
determine the visual activity information depending on the predetermined picture block of the current video frame and depending on the predetermined picture block of each of the one or more timely-preceding video frames and depending on a temporal high-pass filter,
wherein the apparatus is an apparatus for determining a visual quality value for the video sequence,
wherein the apparatus is configured to acquire a plurality of visual activity values by determining the visual activity information for each picture block of one or more of the plurality of picture blocks of one or more of the plurality of video frames of the video sequence,
wherein the apparatus is configured to determine the visual quality value depending on the plurality of visual activity values;
wherein the apparatus is configured to determine the visual quality value for the video sequence by determining a visual quality value for a video frame of one or more of the plurality of video frames of the video sequence;
wherein the apparatus is configured to define the visual quality value for said video frame of the plurality of video frames of the video sequence according to:

$$WPSNR_{c,s} = 10 \cdot \log_{10}\left(\frac{W \cdot H \cdot (2^{BD} - 1)^2}{\Sigma_{k \in s}\left(w_k \cdot \Sigma_{[x,y] \in B_k}(s_c[x,y] - s[x,y])^2\right)}\right)$$

wherein $WPSNR_{c,s}$ indicates the visual quality value for said video frame, wherein W is a width of a plurality of picture samples of said video frame, wherein H is a height of the plurality of picture samples of said video frame, wherein BD is the coding bit-depth per sample, and wherein s[x, y] is an original picture sample at (x, y), wherein $s_c$[x, y] is a decoded picture sample at (x, y), which results from decoding an encoding of the original picture sample at (x, y), and
wherein $$w_k = \left(\frac{a_{pic}}{a_k}\right)^\beta,$$

wherein $a_k$ is the visual activity information for said picture block, wherein $a_{pic} > 0$, and wherein $0 < \beta < 1$; or wherein the apparatus is configured to determining the visual quality value for the video sequence according to $$WPSNR'_c = 10 \cdot \log_{10}\left(\frac{F \cdot W \cdot H \cdot (2^{BD} - 1)^2}{\sum_{i=1}^{F}\left(\sum_{k \in i}\left(w_k \cdot \sum_{[x,y] \in B_k}(s_{c,i}[x,y] - s_i[x,y])^2\right)\right)}\right)$$

or according to $$WPSNR_c^{smr} =$$

$$20 \cdot \log_{10}\left(\frac{F \cdot \sqrt{W \cdot H} \cdot (2^{BD} - 1)}{\sum_{i=1}^{F}\sqrt{\sum_{k \in i}\left(w_k \cdot \sum_{[x,y] \in B_k}(s_{c,i}[x,y] - s_i[x,y])^2\right)}}\right)$$

wherein F indicates a number of the plurality of video frames of the video sequence, wherein W is a width of a plurality of picture samples of said video frame, wherein H is a height of the plurality of picture samples of said video frame, wherein BD is the coding bit-depth per sample, and wherein i is an index indicating one of the plurality of video frames of the video sequence, wherein k is an index indicating one of the plurality of picture blocks of one of the plurality of video frames of the video sequence, wherein $B_k$ is said one of the plurality of picture blocks of one of the plurality of video frames of the video sequence, wherein $s_i$[x, y] is an original picture sample at (x, y), wherein $s_{c,i}$[x, y] is a decoded picture sample at (x, y), which results from decoding an encoding of the original picture sample at (x, y),
wherein $$w_k = \left(\frac{a_{pic}}{a_k}\right)^\beta,$$

wherein $a_k$ is the visual activity information for said picture block $B_k$, wherein $a_{pic} > 0$, and wherein $0 < \beta < 1$.

12. Apparatus according to claim 11,
wherein β=0.5, and
wherein $$a_{pic} = 2^{BD} \cdot \sqrt{\frac{3840 \cdot 2160}{W \cdot H}}$$

or $$a_{pic} = \hat{a}_{pic} = 2^{(BD+1)} \cdot \sqrt{\frac{3840 \cdot 2160}{W \cdot H}}.$$

13. Method for determining visual activity information for a predetermined picture block of a video sequence comprising a plurality of video frames, the plurality of video frames comprising a current video frame and one or more timely-preceding video frames, wherein the one or more timely-preceding video frames precede the current video frame in time, wherein the method comprises:
  receiving the predetermined picture block of each of the one or more timely-preceding video frames and the predetermined picture block of the current video frame,
  determining the visual activity information depending on the predetermined picture block of the current video frame and depending on the predetermined picture block of each of the one or more timely-preceding video frames and depending on a temporal high-pass filter;
  wherein the method comprises determining the visual activity information depending on a spatial high-pass filter and/or the temporal high-pass filter;
  wherein the method comprises downsampling the predetermined picture block of the current video frame to acquire a downsampled picture block, and to apply the spatial high-pass filter and/or the temporal high-pass filter on each of a plurality of picture samples of the downsampled picture block, or
  wherein the method comprises applying the spatial high-pass filter and/or the temporal high-pass filter on only a first group of the plurality of picture samples of the predetermined picture block, but not on a second group of the plurality of picture samples of the predetermined picture block;
  wherein applying the spatial high-pass filter and/or the temporal high-pass filter is conducted on only the first group of the plurality of picture samples, the first group of the plurality of picture samples comprising exactly those of the plurality of picture samples of the predetermined picture block which are located in a row with an even row index and which are located in a column with an even column index, but not on the second group of the plurality of picture samples of the predetermined picture block, comprising exactly those of the plurality of picture samples of the predetermined picture block which are located in a row with an odd row index and/or which are located in a column with an odd column index; or
  wherein applying the spatial high-pass filter and/or the temporal high-pass filter is conducted on only the first group of the plurality of picture samples, the first group of the plurality of picture samples comprising exactly those of the plurality of picture samples of the predetermined picture block which are located in a row with an odd row index and which are located in a column with an odd column index, but not on the second group of the plurality of picture samples of the predetermined picture block, comprising exactly those of the plurality of picture samples of the predetermined picture block which are located in a row with an even row index and/or which are located in a column with an even column index; or
  wherein applying the spatial high-pass filter and/or the temporal high-pass filter is conducted on only the first group of the plurality of picture samples, the first group of the plurality of picture samples comprising exactly those of the plurality of picture samples of the predetermined picture block which are located in a row with an odd row index and which are located in a column with an even column index, but not on the second group of the plurality of picture samples of the predetermined picture block, comprising exactly those of the plurality of picture samples of the predetermined picture block which are located in a row with an even row index and/or which are located in a column with an odd column index; or
  wherein applying the spatial high-pass filter and/or the temporal high-pass filter is conducted on only the first group of the plurality of picture samples, the first group of the plurality of picture samples comprising exactly those of the plurality of picture samples of the predetermined picture block which are located in a row with an even row index and which are located in a column with an odd column index, but not on the second group of the plurality of picture samples of the predetermined picture block, comprising exactly those of the plurality of picture samples of the predetermined picture block which are located in a row with an odd row index and/or which are located in a column with an even column index; or
  wherein the spatial high-pass filter being applied on only the first group of the plurality of picture samples is defined according to:

$$\check{h}_{s_i}[x, y] = s_i[x, y] * \check{H}_s$$

wherein $$\check{H}_s = \begin{bmatrix} -1 & -1 & -2 & -2 & -1 & -1 \\ -1 & -1 & -2 & -2 & -1 & -1 \\ -2 & -2 & 12 & 12 & -2 & -2 \\ -2 & -2 & 12 & 12 & -2 & -2 \\ -1 & -1 & -2 & -2 & -1 & -1 \\ -1 & -1 & -2 & -2 & -1 & -1 \end{bmatrix}, \text{ or }$$

$$\check{H}_s = \begin{bmatrix} 0 & -1 & -1 & -1 & -1 & 0 \\ -1 & -2 & -3 & -3 & -2 & -1 \\ -1 & -3 & 12 & 12 & -3 & -1 \\ -1 & -3 & 12 & 12 & -3 & -1 \\ -1 & -2 & -3 & -3 & -2 & -1 \\ 0 & -1 & -1 & -1 & -1 & 0 \end{bmatrix},$$

wherein $s_i[x, y]$ indicates a picture sample of the first group.

14. A non-transitory digital storage medium having a computer program stored thereon to perform the method of claim 13, when said computer program is executed by a computer or signal processor.

15. A method for determining visual activity information according to claim 13,
  wherein the method implements a method for varying a coding quantization parameter across a picture,
  wherein the method for varying the coding quantization parameter across the picture further comprises determining a coding quantization parameter for the predetermined block depending on the visual activity information.

16. A method for varying a coding quantization parameter across the picture according to claim 15,
wherein the method implements an encoding method for encoding a picture into a data stream,
wherein the encoding method further comprises encoding the picture into the data stream using the coding quantization parameter.

17. A method for varying a coding quantization parameter across the picture according to claim 15,
wherein the method implements a decoding method for decoding a picture from a data stream,
wherein the decoding method further comprises decoding the picture from the data stream using the coding quantization parameter.

18. Method for determining visual activity information for a predetermined picture block of a video sequence comprising a plurality of video frames, the plurality of video frames comprising a current video frame and one or more timely-preceding video frames, wherein the one or more timely-preceding video frames precede the current video frame in time, wherein the method comprises:
receiving the predetermined picture block of each of the one or more timely-preceding video frames and the predetermined picture block of the current video frame,
determining the visual activity information depending on the predetermined picture block of the current video frame and depending on the predetermined picture block of each of the one or more timely-preceding video frames and depending on a temporal high-pass filter,
wherein the method is a method for determining a visual quality value for the video sequence,
wherein the method comprises acquiring a plurality of visual activity values by determining the visual activity information for each picture block of one or more of the plurality of picture blocks of one or more of the plurality of video frames of the video sequence,
wherein the method comprises determining the visual quality value depending on the plurality of visual activity values;
wherein determining the visual quality value for the video sequence is conducted by determining a visual quality value for a video frame of one or more of the plurality of video frames of the video sequence;
wherein the method comprises defining the visual quality value for said video frame of the plurality of video frames of the video sequence according to:

$$WPSNR_{c,s} = 10 \cdot \log_{10}\left(\frac{W \cdot H \cdot (2^{BD}-1)^2}{\sum_{k \in s}\left(w_k \cdot \sum_{[x,y] \in B_k}(s_c[x,y]-s[x,y])^2\right)}\right)$$

wherein $WPSNR_{c,s}$ indicates the visual quality value for said video frame, wherein W is a width of a plurality of picture samples of said video frame, wherein H is a height of the plurality of picture samples of said video frame, wherein BD is the coding bit-depth per sample, and wherein $s[x, y]$ is an original picture sample at (x, y), wherein $s_c[x, y]$ is a decoded picture sample at (x, y), which results from decoding an encoding of the original picture sample at (x, y), and wherein $$w_k = \left(\frac{a_{pic}}{a_k}\right)^\beta,$$

wherein $a_k$ is the visual activity information for said picture block, wherein $a_{pic}>0$, and wherein $0<\beta<1$; or
wherein determining the visual quality value for the video sequence is conducted according to $$WPSNR'_c = 10 \cdot \log_{10}\left(\frac{F \cdot W \cdot H \cdot (2^{BD}-1)^2}{\sum_{i=1}^{F}\left(\sum_{k \in i}\left(w_k \cdot \sum_{[x,y] \in B_k}(s_{c,i}[x,y]-s_i[x,y])^2\right)\right)}\right)$$

or according to $$WPSNR_c^{smr} =$$

$$20 \cdot \log_{10}\left(\frac{F \cdot \sqrt{W \cdot H} \cdot (2^{BD}-1)}{\sum_{i=1}^{F}\sqrt{\sum_{k \in i}\left(w_k \cdot \sum_{[x,y] \in B_k}(s_{c,i}[x,y]-s_i[x,y])^2\right)}}\right)$$

wherein F indicates a number of the plurality of video frames of the video sequence, wherein W is a width of a plurality of picture samples of said video frame, wherein H is a height of the plurality of picture samples of said video frame, wherein BD is the coding bit-depth per sample, and wherein i is an index indicating one of the plurality of video frames of the video sequence, wherein k is an index indicating one of the plurality of picture blocks of one of the plurality of video frames of the video sequence, wherein $B_k$ is said one of the plurality of picture blocks of one of the plurality of video frames of the video sequence, wherein $s_i[x, y]$ is an original picture sample at (x, y), wherein $s_{c,i}[x, y]$ is a decoded picture sample at (x, y), which results from decoding an encoding of the original picture sample at (x, y), wherein $$w_k = \left(\frac{a_{pic}}{a_k}\right)^\beta,$$

wherein $a_k$ is the visual activity information for said picture block $B_k$, wherein $a_{pic}>0$, and wherein $0<\beta<1$.

19. A non-transitory digital storage medium having a computer program stored thereon to perform the method of claim 18, when said computer program is executed by a computer or signal processor.

* * * * *

UNITED STATES PATENT AND TRADEMARK OFFICE
CERTIFICATE OF CORRECTION

PATENT NO. : 12,126,812 B2
APPLICATION NO. : 17/723181
DATED : October 22, 2024
INVENTOR(S) : Christian Helmrich et al.

Page 1 of 1

It is certified that error appears in the above-identified patent and that said Letters Patent is hereby corrected as shown below:

In the Claims

In Claim 11, Column 30, Line 8:
Delete "wherein His" and insert -- wherein H is --

Signed and Sealed this
Twenty-fifth Day of March, 2025

Coke Morgan Stewart
*Acting Director of the United States Patent and Trademark Office*